(12) United States Patent
Xu

(10) Patent No.: US 11,843,715 B2
(45) Date of Patent: Dec. 12, 2023

(54) PHOTOGRAPHING METHOD AND TERMINAL

(71) Applicant: Huawei Technologies Co., Ltd., Shenzhen (CN)

(72) Inventor: Jie Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/766,584

(22) PCT Filed: Nov. 23, 2017

(86) PCT No.: PCT/CN2017/112722
§ 371 (c)(1),
(2) Date: May 22, 2020

(87) PCT Pub. No.: WO2019/100298
PCT Pub. Date: May 31, 2019

(65) Prior Publication Data
US 2020/0374386 A1 Nov. 26, 2020

(51) Int. Cl.
*H04M 1/72469* (2021.01)
*G06F 3/01* (2006.01)
(Continued)

(52) U.S. Cl.
CPC ........ *H04M 1/72469* (2021.01); *G06F 3/017* (2013.01); *G06F 3/0346* (2013.01);
(Continued)

(58) Field of Classification Search
CPC ......... H04M 1/72469; H04M 1/72454; H04M 1/0281; H04M 2250/12; H04M 2250/52;
(Continued)

(56) References Cited

U.S. PATENT DOCUMENTS

| 9,112,984 B2 | 8/2015 | Sejnoha et al. | |
|---|---|---|---|
| 2008/0172634 A1* | 7/2008 | Choi | G03B 11/043 715/822 |

(Continued)

FOREIGN PATENT DOCUMENTS

| CN | 1731793 A | 2/2006 |
|---|---|---|
| CN | 102722321 A | 10/2012 |

(Continued)

OTHER PUBLICATIONS

IP Australia, Examination report No. 2 for IPA Application No. 2017440899 (dated May 27, 2021) (Year: 2021).*

(Continued)

*Primary Examiner* — Justin R. Blaufeld
(74) *Attorney, Agent, or Firm* — Conley Rose, P.C.

(57) ABSTRACT

A terminal includes a camera and a sensor, where the sensor is configured to detect a status of holding the terminal by a user; the terminal displays a first interface, and displays a first photographing control on the first interface in response to detecting that a current status of holding the terminal by the user undergoes a change satisfying a preset condition, where the first interface is not a viewfinder interface of the terminal; and the terminal displays a second interface in response to an operation of the user on the first photographing control, where the second interface is a viewfinder interface of the terminal.

28 Claims, 32 Drawing Sheets

(51) Int. Cl.
*H04M 1/72454* (2021.01)
*G06F 3/0346* (2013.01)
*H04N 23/65* (2023.01)
*G06F 1/3287* (2019.01)
*H04N 23/63* (2023.01)
*H04M 1/02* (2006.01)

(52) U.S. Cl.
CPC ...... *H04M 1/72454* (2021.01); *H04N 23/631* (2023.01); *H04N 23/632* (2023.01); *H04N 23/65* (2023.01); *H04N 23/651* (2023.01); *G06F 1/3287* (2013.01); *H04M 1/0281* (2013.01); *H04M 2250/12* (2013.01); *H04M 2250/52* (2013.01); *H04N 23/63* (2023.01)

(58) Field of Classification Search
CPC ......... H04N 5/23241; H04N 5/232411; H04N 5/232933; H04N 5/232935; H04N 5/23293; G06F 3/0346; G06F 3/017; G06F 1/3287
See application file for complete search history.

(56) References Cited

U.S. PATENT DOCUMENTS

| | | | |
|---|---|---|---|
| 2010/0121636 A1* | 5/2010 | Burke | G10L 25/78 704/E15.04 |
| 2011/0113337 A1* | 5/2011 | Liu | G06F 3/0483 715/727 |
| 2013/0038746 A1* | 2/2013 | Hosokawa | H04N 23/63 348/E5.043 |
| 2013/0053105 A1* | 2/2013 | Lee | H04M 1/673 455/565 |
| 2013/0147844 A1* | 6/2013 | Isozu | G01C 21/3647 345/659 |
| 2013/0326209 A1 | 12/2013 | Dommalapati et al. | |
| 2014/0058806 A1* | 2/2014 | Guenette | G05B 15/02 705/14.1 |
| 2014/0063356 A1* | 3/2014 | Liao | H04M 1/0264 349/2 |
| 2014/0108928 A1* | 4/2014 | Mumick | G06F 3/0488 715/716 |
| 2014/0147092 A1 | 5/2014 | Liu et al. | |
| 2014/0168494 A1* | 6/2014 | Hong | G06F 1/1694 348/333.01 |
| 2014/0240579 A1* | 8/2014 | Park | G06F 3/0488 348/333.11 |
| 2014/0281994 A1* | 9/2014 | Lin | G06F 3/0481 715/719 |
| 2015/0042591 A1 | 2/2015 | Li | |
| 2015/0134322 A1* | 5/2015 | Cuthbert | G06F 40/58 704/3 |
| 2015/0237250 A1* | 8/2015 | Shinozaki | H04N 1/00307 348/211.1 |
| 2015/0319364 A1* | 11/2015 | Jin | H04N 23/631 348/220.1 |
| 2015/0346899 A1* | 12/2015 | Jung | G06F 3/017 345/173 |
| 2016/0026381 A1* | 1/2016 | Kim | G06F 3/04817 715/761 |
| 2016/0062515 A1* | 3/2016 | Bae | G06F 3/0416 345/174 |
| 2016/0077793 A1* | 3/2016 | Disano | G06F 3/04883 715/728 |
| 2016/0080542 A1* | 3/2016 | Park | G06F 3/04817 455/566 |
| 2016/0098138 A1* | 4/2016 | Park | G06F 3/04886 345/173 |
| 2016/0117490 A1* | 4/2016 | Daly | G06F 21/305 726/19 |
| 2016/0179337 A1 | 6/2016 | Ballesteros et al. | |
| 2016/0202867 A1 | 7/2016 | Iwaizumi et al. | |
| 2016/0241784 A1* | 8/2016 | Baek | H04N 23/632 |
| 2017/0094156 A1* | 3/2017 | Kim | G06F 3/013 |
| 2017/0264818 A1 | 9/2017 | Liao | |
| 2017/0293494 A1 | 10/2017 | Long et al. | |
| 2018/0011631 A1* | 1/2018 | Ballesteros | G06F 3/04886 |
| 2018/0024808 A1* | 1/2018 | Wilberding | G06F 3/162 715/716 |
| 2018/0121065 A1* | 5/2018 | Seo | G06F 9/451 |

FOREIGN PATENT DOCUMENTS

| | | | | |
|---|---|---|---|---|
| CN | 102880489 A | 1/2013 | | |
| CN | 102938808 A | 2/2013 | | |
| CN | 103092515 A | 5/2013 | | |
| CN | 103259926 A | 8/2013 | | |
| CN | 103795923 A | 5/2014 | | |
| CN | 104052909 A | * | 9/2014 | ............ H04N 5/225 |
| CN | 104052909 A | 9/2014 | | |
| CN | 105511730 A | 4/2016 | | |
| CN | 105912204 A | 8/2016 | | |
| CN | 106354382 A | 1/2017 | | |
| CN | 106850938 A | 6/2017 | | |
| CN | 107179869 A | 9/2017 | | |
| CN | 103577096 B | * | 1/2019 | ............ G06F 1/3218 |
| EP | 2816442 A1 | 12/2014 | | |
| EP | 3046017 A1 | 7/2016 | | |
| KR | 20080107972 A | * | 12/2008 | ............ H04N 23/50 |
| WO | WO-2011132757 A1 | * | 10/2011 | ............ G03B 17/00 |

OTHER PUBLICATIONS

Biersdorfer, J.D., "How to Stop Waking Up the iPhone" XP055730453, dated Oct. 27, 2017, 2 pages.

* cited by examiner

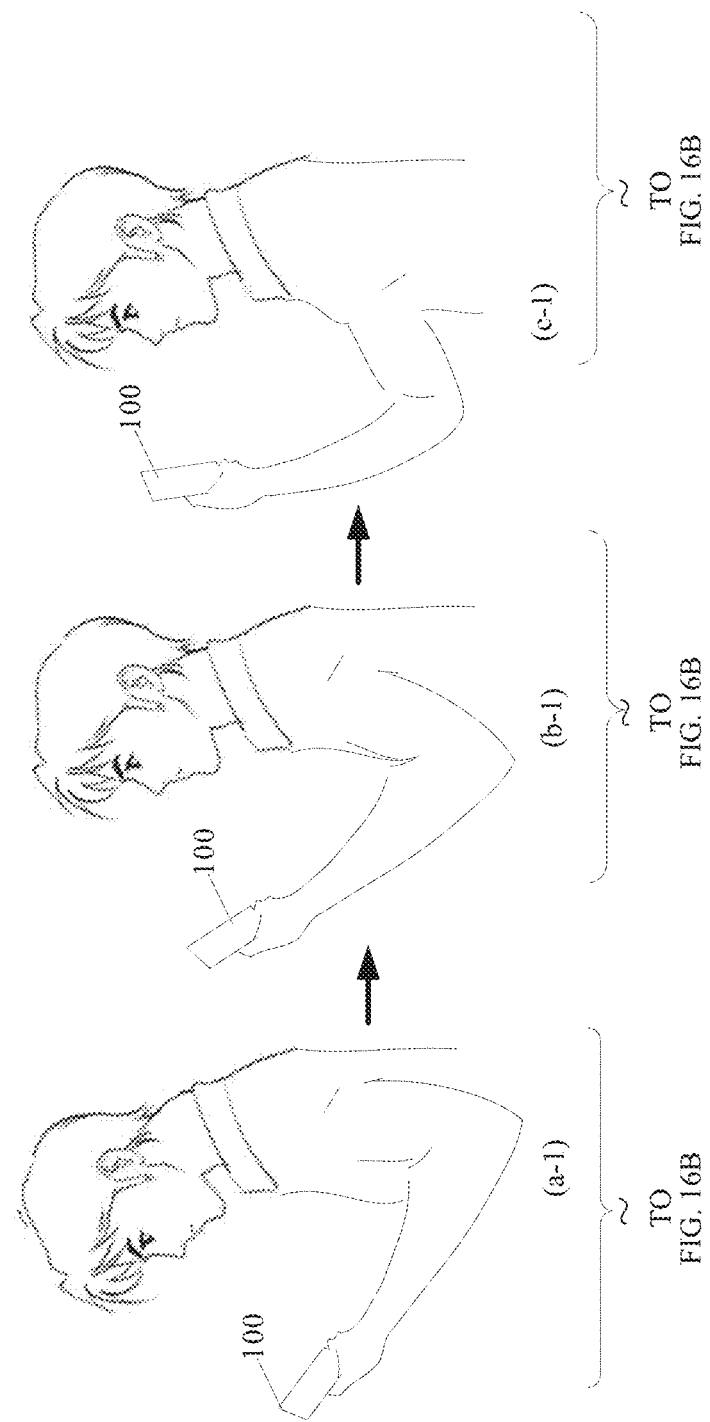

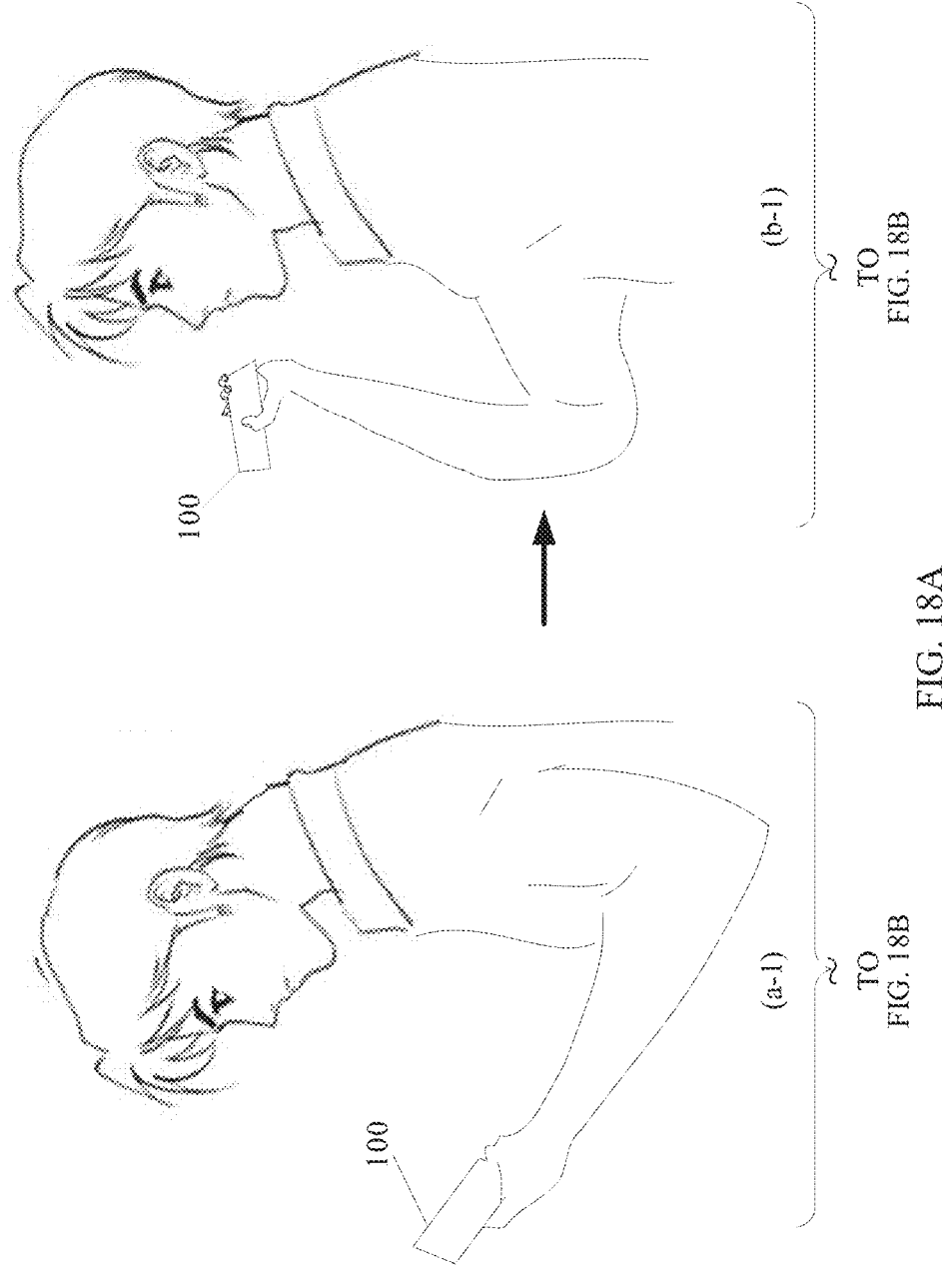

PHOTOGRAPHING METHOD AND TERMINAL

CROSS-REFERENCE TO RELATED APPLICATIONS

This application is a National Stage of International Patent Application No. PCT/CN2017/112722 filed on Nov. 23, 2017, which is hereby incorporated by reference in its entirety.

TECHNICAL FIELD

This application relates to the field of electronic technologies, and in particular, to a photographing method and a terminal.

BACKGROUND

With the progress of society and improvement of people's living standard, more people choose to use photographs to record details of life. For example, a user may tap a "Camera" application icon on a home screen of a mobile phone to control the mobile phone to turn on a camera and display a photographing interface.

When the mobile phone currently displays an interface of another application (for example, WeChat), the user needs to control the mobile phone to exit the currently displayed application interface and display the home screen of the mobile phone, and then taps the "Camera" application icon on the home screen of the mobile phone to control the mobile phone to turn on the camera and display the photographing interface. User operations such as controlling the mobile phone to exit the current application interface and return to the home screen of the mobile phone and then tapping the "Camera" application icon to start the "Camera" application are complex, and human-machine interaction performance is relatively poor.

SUMMARY

This application provides a photographing method and a terminal, to simplify user operations for starting a "Camera" application on the terminal, improve human-machine interaction performance of the terminal, and further improve user experience.

According to a first aspect, this application provides a photographing method, which may be applied to a terminal including a camera and one or more sensors, where the one or more sensors are configured to detect a status of holding the terminal by a user, and the photographing method includes: displaying, by the terminal, a first interface, and displaying a first photographing control on the first interface in response to detecting that a current status of holding the terminal by the user undergoes a change satisfying a preset condition, where the first interface is not a viewfinder interface of the terminal; and displaying a second interface on the terminal in response to an operation of the user on the first photographing control, where the second interface is a viewfinder interface of the terminal.

When the terminal displays the first interface (that is, an interface when the terminal is in a screen-on state), and detects that the status of holding the terminal by the user undergoes the change satisfying the preset condition, the terminal displays, on the first interface, the photographing control used to turn on the camera, so that the user can operate the photographing control to start a "Camera" application for photographing. When the terminal displays the first interface, and automatically detects that the status of holding the terminal by the user undergoes the change satisfying the preset condition, the terminal displays, on the first interface, the photographing control used to turn on the camera, so that the user can operate the photographing control to start the "Camera" application for photographing. This can simplify user operations for starting the "Camera" application on the terminal, improve human-machine interaction performance of the terminal, and further improve user experience.

It may be understood that, the user may want to record some fleeting images, but in a process in which the terminal displays the first interface and displays the second interface after interacting with the user, the images that the user wants to shoot possibly no longer exist, and user experience is affected.

On this basis, in a possible design, when the terminal displays the first interface, the terminal may turn on the camera in the terminal in response to detecting that the current status of holding the terminal by the user undergoes the change satisfying the preset condition, to capture a preview image by using the camera.

In this design, when the terminal displays the first photographing control on the first interface, even if the terminal turns on the camera to capture the preview image, a viewfinder frame of the camera is not displayed on the first interface, that is, the first interface is not a viewfinder interface of the terminal. In other words, even if the terminal has turned on the camera for viewfinder setting and photographing, because the terminal does not display the viewfinder interface, the user cannot see, on a display screen of the terminal, the image captured or taken by the terminal by using the camera.

In another possible design, the terminal may turn on the camera when displaying the first photographing control on the first interface. Because the terminal has turned on the camera when displaying the first interface, and has captured the preview image by using the camera, the terminal may save, in response to the operation of the user on the first photographing control on the first interface, a first image obtained based on the preview image, and display the second interface.

Specifically, the displaying a second interface on the terminal in response to an operation of the user on the first photographing control includes: saving, in the terminal in response to a first operation of the user on the first photographing control, a first image obtained based on the preview image, and displaying the second interface on the terminal. The first operation may be a tap operation, a touch and hold operation, a double-tap operation, a slide-up operation, or a slide-down operation.

Optionally, when the first operation is a different operation, the first image may be different image content. For example, when the first operation is a slide-up operation of the user on the first photographing control, the first image saved by the terminal may be an image whose definition is the highest in the preview images captured by the camera; or when the first operation is a slide-down operation of the user on the first photographing control, the first image saved by the terminal may be a video image including a plurality of preview images captured by the camera.

In another possible design, the one or more sensors may determine, by detecting that the terminal is rotated, or that the terminal moves forward relatively to the user, or that the terminal moves upward relatively to a horizontal line, whether the status of holding the terminal by the user undergoes the change satisfying the preset condition.

Specifically, the terminal may detect a motion parameter of the terminal; then determine, based on the motion parameter, whether the terminal is rotated, or whether the terminal moves forward relatively to the user, or whether the terminal moves upward relatively to the horizontal line; and finally determine, based on a determining result, whether the status of holding the terminal by the user undergoes the change satisfying the preset condition. For example, when the motion parameter detected by the sensor in the terminal indicates that the terminal is "rotated", "moving forward", and "moving upward", the first photographing control may be normally displayed; or when the motion parameter detected by the sensor in the terminal indicates that the terminal is "rotated", "moving forward", and "moving upward, but an upward amplitude is insufficient", the first photographing control may be normally displayed but is relatively small, and transparency of the first photographing control is relatively high.

In another possible design, that a current status of holding the terminal by the user undergoes a change satisfying a preset condition specifically includes: an included angle between a display screen of the terminal and a horizontal screen line is within a preset range after the one or more sensors detect that the terminal is rotated and moves upward In another possible design, when the operation (that is, a second operation) of the user on the first photographing control may be a different user operation such as a tap operation, a double-tap operation, or a touch and hold operation, the second interface may also be a photographing interface in a different photographing mode of the terminal. To be specific, the second interface is a photographing interface of the terminal in a photographing mode corresponding to the second operation. Photographing modes of the terminal may include at least a photographing mode using a rear-facing camera, a self-photographing mode, a panoramic mode, and a video mode. Specifically, the displaying a second interface on the terminal in response to an operation of the user on the first photographing control may include: displaying, on the terminal in response to a second operation of the user on the first photographing control, a viewfinder interface in a photographing mode corresponding to the second operation.

The terminal may display viewfinder interfaces in different photographing modes in response to different operations of the user on the first photographing control. Therefore, the user can control, by performing different operations on the first photographing control, the terminal to directly display a corresponding viewfinder interface, and does not need to control the terminal to switch between photographing modes after controlling the terminal to display the viewfinder interface for photographing by the rear-facing camera.

In another possible design, the second interface includes a second photographing control. After the displaying a second interface on the terminal in response to an operation of the user on the first photographing control, the method in this application further includes: saving, in the terminal in response to a third operation of the user on the second photographing control, an image captured by the camera in response to the third operation.

Optionally, to facilitate user operations, when a left hand of the user holds the terminal, the terminal may display the second photographing control in a high-frequency touch area on a left side of the second interface, or when a right hand of the user holds the terminal, the terminal may display the second photographing control in a high-frequency touch area on a right side of the second interface.

In this application, the terminal may display, on the second interface, the second photographing control used to control the terminal to perform photographing, and the second photographing control may be displayed on one side on which the user holds the terminal, so that the user can operate the second photographing control more conveniently and comfortably. This can avoid a problem that a single hand of the user cannot conveniently tap a shutter of the terminal for photographing when a touchscreen of the terminal is relatively large, and can improve user experience.

In another possible design, after the displaying a second interface on the terminal in response to an operation of the user on the first photographing control, the method in this application further includes: displaying a third interface on the terminal in response to a fourth operation of the user on the second photographing control, where the fourth operation is used to instruct the terminal to switch between photographing modes of the terminal, the third interface is a viewfinder interface of the terminal in a photographing mode corresponding to the fourth operation, and the fourth operation is different from the third operation.

The terminal may switch between the photographing modes of the terminal in response to the fourth operation of the user on the second photographing control. This improves efficiency of switching between the photographing modes of the terminal by the user, and improves user experience.

In another possible design, display positions of the first photographing control and the second photographing control on the display screen of the terminal are the same.

In another possible design, the terminal may display, in a floating manner, the first photographing control on the first interface displayed by the terminal. Therefore, the terminal can display, on the first interface in response to a moving operation of the user on the first photographing control, dynamic images of the first photographing control that dynamically moves along a moving track of the moving operation.

In another possible design, after the terminal displays the first interface including the first photographing control, if the terminal does not receive the first operation of the user on the first photographing control within a preset time, it indicates that an operation of holding the terminal by the user may be an unintentional operation of the user. To prevent the terminal from displaying the first photographing control on the first interface due to an unintentional operation of the user, the terminal may display the first photographing control that gradually scales down, until the first photographing control is not displayed. Specifically, the method in this application may further include: after the displaying, in a floating manner, the first photographing control on the first interface displayed by the terminal, if no operation on the floating first photographing control is detected within a preset time, no longer displaying the first photographing control on the first interface.

In another possible design, the displaying, by the terminal when displaying a first interface, a first photographing control on the first interface in response to detecting that a current status of holding the terminal by the user undergoes a change satisfying a preset condition includes: when the terminal displays the first interface, displaying, by the terminal, the first photographing control on a left side of the first interface in the floating manner in response to detecting that the terminal is currently held by the left hand of the user, or displaying the first photographing control on a right side of the first interface in the floating manner in response to detecting that the terminal is currently held by the right hand of the user.

The terminal may display the first photographing control on the left side of the first interface when the left hand of the user holds the terminal, or display the first photographing control on the right side of the first interface when the right hand of the user holds the terminal, so that the user can operate the first photographing control more conveniently and comfortably, and user experience can be improved.

In another possible design, before the displaying a first photographing control on the first interface of the terminal, the method in this application further includes: detecting that the camera is in an off state. To be specific, the first photographing control is displayed on the first interface only when the camera is in the off state. If the camera is in an on state (for example, when the terminal turns on the camera for photographing), even if the terminal detects that the current status of holding the terminal by the user undergoes the change satisfying the preset condition, the terminal does not display the first photographing control.

According to a second aspect, this application provides a terminal, the terminal includes a camera and one or more sensors, and the terminal includes a detection unit and a display unit. The detection unit is configured to detect, by using the one or more sensors, a status of holding the terminal by a user; and the display unit is configured to: display a first interface; display a first photographing control on the first interface in response to detecting, by the detection unit, that a current status of holding the terminal by the user undergoes a change satisfying a preset condition, where the first interface is not a viewfinder interface of the terminal; and display a second interface in response to an operation of the user on the first photographing control, where the second interface is a viewfinder interface of the terminal.

In a possible design, the terminal further includes a turn-on unit, where the turn-on unit is configured to: when the terminal displays the first interface, turn on the camera in response to detecting, by the detection unit, that the current status of holding the terminal by the user undergoes the change satisfying the preset condition, to capture a preview image by using the camera.

In another possible design, the terminal further includes a storage unit, where the storage unit is configured to save, in response to a first operation of the user on the first photographing control, a first image obtained based on the preview image.

In another possible design, that a current status of holding the terminal by the user undergoes a change satisfying a preset condition specifically includes: an included angle between the display unit and a horizontal screen line is within a preset range after the detection unit detects, by using the sensor, that the terminal is rotated and moves upward.

In another possible design, that the display unit is configured to display a second interface on the terminal in response to an operation of the user on the first photographing control includes: the display unit is configured to display, in response to a second operation of the user on the first photographing control, a viewfinder interface in a photographing mode corresponding to the second operation, where the photographing mode corresponding to the second operation is any one of a photographing mode using a rear-facing camera, a self-photographing mode, a panoramic mode, and a video recording mode.

In another possible design, the second interface includes a second photographing control; and after the display unit displays the second interface on the terminal in response to the operation of the user on the first photographing control, the storage unit is configured to save, in response to a third operation of the user on the second photographing control, an image captured by the camera in response to the third operation.

In another possible design, after displaying the second interface on the terminal in response to the operation of the user on the first photographing control, the display unit is further configured to display a third interface on the terminal in response to a fourth operation of the user on the second photographing control, where the fourth operation is used to instruct the terminal to switch between photographing modes of the terminal, the third interface is a viewfinder interface of the terminal in a photographing mode corresponding to the fourth operation, and the fourth operation is different from the third operation.

In another possible design, display positions of the first photographing control and the second photographing control in the display unit are the same.

In another possible design, that the display unit is configured to display a first photographing control on the first interface includes: the display unit is configured to display the first photographing control on the first interface in a floating manner.

In another possible design, the display unit is further configured to no longer display the first photographing control on the first interface if the detection unit detects no operation on the floating first photographing control within a preset time after the first photographing control is displayed on the first interface in the floating manner.

In another possible design, the detection unit is further configured to detect that the terminal is currently held by a left hand of the user or held by a right hand of the user; and that the display unit is configured to display the first photographing control on the first interface in a floating manner specifically includes: the display unit is configured to display the first photographing control on a left side of the first interface in the floating manner in response to detecting, by the detection unit, that the terminal is currently held by the left hand of the user, or display the first photographing control on a right side of the first interface in the floating manner in response to detecting that the terminal is currently held by the right hand of the user.

In another possible design, before the display unit displays the first photographing control on the first interface, the detection unit is further configured to detect that the camera is in an off state.

According to a third aspect, this application provides a terminal, the terminal includes a processor, a memory, a touchscreen, a camera, and one or more sensors, and the memory, the touchscreen, the sensor, and the camera are coupled to the processor. The memory is configured to store computer program code, where the computer program code includes a computer instruction. When the processor executes the computer instruction, the one or more sensors are configured to detect a status of holding the terminal by a user; and the touchscreen is configured to display a first interface, and display the first interface including a first photographing control on the touchscreen in response to detecting that a current status of holding the terminal by the user undergoes a change satisfying a preset condition, where the first interface is not a viewfinder interface of the terminal; and display a second interface on the touchscreen in response to an operation of the user on the first photographing control, where the second interface is a viewfinder interface of the terminal.

In a possible design, the processor is further configured to: when the touchscreen displays the first interface, turn on the camera in response to detecting, by the one or more sensors, that the current status of holding the terminal by the user undergoes the change satisfying the preset condition, to capture a preview image by using the camera.

In another possible design, the memory is configured to save, in response to a first operation of the user on the first photographing control, a first image obtained based on the preview image.

In another possible design, that a current status of holding the terminal by the user undergoes a change satisfying a preset condition specifically includes: an included angle between the touchscreen and a horizontal screen line is within a preset range after the one or more sensors detect that the terminal is rotated and moves upward.

In another possible design, that the touchscreen is configured to display a second interface in response to an operation of the user on the first photographing control includes: the touchscreen is configured to display, in response to a second operation of the user on the first photographing control, a viewfinder interface in a photographing mode corresponding to the second operation, where the photographing mode corresponding to the second operation is any one of a photographing mode using a rear-facing camera, a self-photographing mode, a panoramic mode, and a video recording mode.

In another possible design, the second interface includes a second photographing control; and after the touchscreen displays the second interface in response to the operation of the user on the first photographing control, the memory is configured to save, in response to a third operation of the user on the second photographing control, an image captured by the camera in response to the third operation.

In another possible design, after displaying the second interface on the terminal in response to the operation of the user on the first photographing control, the touchscreen is further configured to display a third interface on the terminal in response to a fourth operation of the user on the second photographing control, where the fourth operation is used to instruct the terminal to switch between photographing modes of the terminal, the third interface is a viewfinder interface of the terminal in a photographing mode corresponding to the third operation, and the fourth operation is different from the third operation.

In another possible design, display positions of the first photographing control and the second photographing control on the touchscreen are the same.

In another possible design, that the touchscreen is configured to display the first interface including a first photographing control includes: the touchscreen is configured to display, in a floating manner, the first photographing control on the first interface displayed on the touchscreen.

In another possible design, the touchscreen is further configured to no longer display the first photographing control on the first interface if the one or more sensors detect no operation on the floating first photographing control within a preset time after the first photographing control is displayed on the first interface in the floating manner.

In another possible design, the one or more sensors are further configured to detect that the terminal is currently held by a left hand of the user or held by a right hand of the user; and that the touchscreen is configured to display the first photographing control on the first interface in a floating manner specifically includes: the touchscreen is configured to display the first photographing control on a left side of the first interface in the floating manner in response to detecting, by the one or more sensors, that the terminal is currently held by the left hand of the user, or display the first photographing control on a right side of the first interface in the floating manner in response to detecting that the terminal is currently held by the right hand of the user.

In another possible design, before the touchscreen displays the first photographing control on the first interface, the one or more sensors are further configured to detect that the camera is in an off state.

According to a fourth aspect, this application provides a photographing method, which may be applied to a terminal including a camera and one or more sensors, where the one or more sensors are configured to detect a status of holding the terminal by a user, and the method includes: detecting a user operation in a screen-off state of the terminal; if the user operation is an operation of lighting a screen, lighting the screen, and displaying a first interface; if the user operation is a first gesture, and the first gesture is that a current status of holding the terminal by the user undergoes a change satisfying a preset condition, and the first gesture is different from the operation of lighting the screen, displaying a second interface, where the second interface is different from the first interface, a first photographing control is displayed on the second interface, and the second interface is not a viewfinder interface of the terminal; and displaying a viewfinder interface of the terminal on the terminal in response to an operation of the user on the first photographing control.

In this application, when the terminal is in the screen-off state, the terminal may display the first interface in response to the user operation of lighting the screen; then if the user operation is the first gesture, the terminal may display the second interface including the first photographing control; and finally, the terminal displays the viewfinder interface of the terminal in response to the operation of the user on the first photographing control. When the terminal automatically detects that the status of holding the terminal by the user undergoes the change satisfying the preset condition, the terminal displays the second interface including the photographing control used to turn on the camera, so that the user can operate the photographing control to start a "Camera" application for photographing. This can simplify user operations for starting the "Camera" application on the terminal, improve human-machine interaction performance of the terminal, and further improve user experience.

According to a fifth aspect, this application provides a terminal, which may be applied to a terminal including a camera and one or more sensors, where the one or more sensors are configured to detect a status of holding the terminal by a user, and the terminal includes a detection unit and a display unit, where the detection unit is configured to detect a user operation in a screen-off state of the terminal; the display unit is configured to: if the user operation detected by the detection unit is an operation of lighting a screen, light the screen, and display a first interface; and the display unit is further configured to: if the user operation detected by the detection unit is a first gesture, and the first gesture is that a current status of holding the terminal by the user undergoes a change satisfying a preset condition, and the first gesture is different from the operation of lighting the screen, display a second interface, where the second interface is different from the first interface, a first photographing control is displayed on the second interface, and the second interface is not a viewfinder interface of the terminal; and display a viewfinder interface of the terminal in response to an operation of the user on the first photographing control.

According to a sixth aspect, this application provides a terminal, the terminal includes a processor, a memory, a touchscreen, a camera, and one or more sensors, and the memory, the touchscreen, and the one or more sensors are coupled to the processor; the memory is configured to store computer program code, where the computer program code includes a computer instruction; the processor is configured to: when executing the computer instruction, detect a user operation in a screen-off state of the terminal; and if the user operation is an operation of lighting the touchscreen, light the touchscreen; the touchscreen is configured to display a first interface when the touchscreen is lit; and the touchscreen is further configured to: if the user operation detected by the one or more sensors is a first gesture, and the first gesture is that a current status of holding the terminal by a user undergoes a change satisfying a preset condition, and the first gesture is different from the operation of lighting the screen, display a second interface, where the second interface is different from the first interface, a first photographing control is displayed on the second interface, and the second interface is not a viewfinder interface of the terminal; and display a viewfinder interface of the terminal in response to an operation of the user on the first photographing control.

It may be understood that, the terminals in the fifth aspect and the sixth aspect and possible designs thereof are all configured to perform the corresponding methods provided above. Therefore, for beneficial effects that the terminals can achieve, refer to beneficial effects in the corresponding methods provided above. Details are not described again herein.

According to a seventh aspect, this application provides a control method, which may be applied to a terminal including a microphone and one or more sensors, and the sensor is configured to detect a status of holding the terminal by a user, and the method includes: displaying a microphone control on a screen of the terminal in a microphone-off state of the terminal in response to detecting that a current status of holding the terminal by the user undergoes a change satisfying a preset condition; and turning on the microphone in response to an operation of the user on the microphone control.

When the microphone of the terminal is in the off state, and it is detected that the status of holding the terminal by the user undergoes the change satisfying the preset condition, the microphone control is displayed on the screen of the terminal, so that the user can turn on the microphone by operating the microphone control, to record voice data. This can simplify user operations for recording the voice data on the terminal, improve human-machine interaction performance of the terminal, and further improve user experience.

In a possible design, the displaying a microphone control on a screen of the terminal is specifically: displaying the microphone control on the screen of the terminal in a floating manner.

In another possible design, the method in this application may further include: displaying the microphone control in a high-frequency touch area on a left side of the screen of the terminal in response to detecting that the terminal is held by a left hand of the user, or displaying the microphone control in a high-frequency touch area on a right side of the screen of the terminal in response to detecting that the terminal is held by a right hand of the user.

The terminal may display the microphone control in the high-frequency touch area on the left side of the screen when the terminal is held by the left hand of the user, or display the microphone control in the high-frequency touch area on the right side of the screen when the terminal is held by the right hand of the user, so that the user can operate the microphone more conveniently and comfortably, and user experience can be improved.

In another possible design, that a current status of holding the terminal by the user undergoes a change satisfying a preset condition specifically includes: an included angle between a touchscreen of the terminal and a horizontal line is within a preset range after the one or more sensors detect that the terminal is rotated and moves upward.

In another possible design, the turning on the microphone in response to an operation of the user on the microphone control specifically includes: turning on the microphone in response to the operation of the user on the microphone control, and enabling a speech recognition function.

According to an eighth aspect, this application provides a terminal, the terminal includes a microphone and one or more sensors, and the terminal further includes a detection unit, a display unit, and a turn-on unit; the detection unit is configured to detect, by using the sensor, a status of holding the terminal by a user; the display unit is configured to display a microphone control in a microphone-off state of the terminal in response to detecting, by the detection unit, that a current status of holding the terminal by the user undergoes a change satisfying a preset condition; and the turn-on unit is configured to turn on the microphone in response to an operation of the user on the microphone control.

In a possible design, the display unit is specifically configured to display the microphone control in a floating manner.

In another possible design, the display unit is specifically configured to display the microphone control in a high-frequency touch area on a left side of a screen of the terminal in response to detecting, by the detection unit, that the terminal is held by a left hand of the user, or display the microphone control in a high-frequency touch area on a right side of a screen of the terminal in response to detecting, by the detection unit, that the terminal is held by a right hand of the user.

In another possible design, that a current status of holding the terminal by the user undergoes a change satisfying a preset condition specifically includes: an included angle between a touchscreen of the terminal and a horizontal line is within a preset range after the detection unit detects, by using the one or more sensors, that the terminal is rotated and moves upward.

In another possible design, the turn-on unit is specifically configured to turn on the microphone in response to the operation of the user on the microphone control, and enable a speech recognition function.

According to a ninth aspect, this application provides a terminal, the terminal includes a processor, a memory, a microphone, a touchscreen, and one or more sensors, and the memory, the touchscreen, and the one or more sensors are coupled to the processor; the memory is configured to store computer program code, where the computer program code includes a computer instruction; and when the processor executes the computer instruction, the one or more sensors are configured to detect a status of holding the terminal by a user; the touchscreen is configured to display a microphone control in the microphone-off state in response to detecting, by the one or more sensors, that a current status of holding the terminal by the user undergoes a change satisfying a preset condition; and the processor is further configured to turn on the microphone in response to an operation of the user on the microphone control displayed by the touchscreen.

In a possible design, the touchscreen displays the microphone control in a floating manner.

In another possible design, the touchscreen is specifically configured to display the microphone control in a high-frequency touch area on a left side of the screen of the terminal in response to detecting, by the one or more sensors, that the terminal is held by a left hand of the user, or display the microphone control in a high-frequency touch area on a right side of the screen of the terminal in response to detecting, by the one or more sensors, that the terminal is held by a right hand of the user.

In another possible design, that a current status of holding the terminal by the user undergoes a change satisfying a preset condition specifically includes: an included angle between the touchscreen of the terminal and a horizontal line is within a preset range after the one or more sensors detect that the terminal is rotated and moves upward.

In another possible design, the processor is further configured to turn on the microphone in response to the operation of the user on the microphone control, and enable a speech recognition function.

According to a tenth aspect, this application provides a communication method, which may be applied to a terminal including a left antenna and a right antenna, where the left antenna is disposed on a left part of the terminal, the right antenna is disposed on a right part of the terminal, and the method in this application includes: in a voice communication process of the terminal, detecting a current status of holding the terminal by a user; and when the current status of holding the terminal by the user is a state of holding the mobile phone by a left hand, increasing transmit/receive power of the right antenna; or when the current status of holding the terminal by the user is a state of holding the mobile phone by a right hand, increasing transmit/receive power of the left antenna.

In this application, the terminal may determine, in the voice communication process of the terminal, the status of holding the terminal by the user; and when the status of holding the terminal by the user is the state of holding by the left hand, considering that the left antenna may suffer relatively great interference, to ensure that voice communication quality of the terminal is not affected, the transmit/receive power of the right antenna may be increased; or when the current status of holding the terminal by the user is the state of holding by the right hand, considering that the right antenna may suffer relatively great interference, to ensure that voice communication quality of the terminal is not affected, the transmit/receive power of the left antenna may be increased.

In a possible design, when the status of holding the terminal by the user is the state of holding by the left hand, the left antenna may suffer relatively great interference; or when the status of holding the terminal by the user is the state of holding by the right hand, the right antenna may suffer relatively great interference. Therefore, if one antenna of the terminal suffers relatively great interference, to reduce power consumption of the terminal, the terminal may reduce transmit/receive power of the antenna. Specifically, after the detecting a current status of holding the terminal by a user in a voice communication process of the terminal, the method in this application further includes: when the status of holding the terminal by the user is the state of holding by the left hand, suppressing the transmit/receive power of the left antenna; or when the status of holding the terminal by the user is the state of holding by the right hand, suppressing the transmit/receive power of the right antenna.

The terminal may increase transmit/receive power of one antenna that suffers less interference, and suppress transmit/receive power of the other antenna that suffers more interference. Therefore, power consumption of the terminal can be reduced while it is ensured that voice communication quality of the terminal is not affected.

In another possible design, to improve efficiency of performing voice communication by the user by using the terminal, the terminal may further adjust volume of a left voice channel and volume of a right voice channel of the terminal based on the status of holding the terminal by the user. After the detecting a current status of holding the terminal by a user in a voice communication process of the terminal, the method in this application further includes: when the current status of holding the terminal by the user is the state of holding the mobile phone by the left hand, turning up the volume of the left voice channel of the terminal; or when the current status of holding the terminal by the user is the state of holding the mobile phone by the right hand, turning up the volume of the right voice channel of the terminal.

If the current status of holding the terminal by the user is the state of holding the mobile phone by the right hand, it indicates that the right side of the terminal is closer to an ear of the user. To enable the user to more clearly hear voice information transmitted from a peer device in the voice communication, the terminal may turn up the volume of the right voice channel of the terminal.

In another possible design, when the current status of holding the terminal by the user is the state of holding the mobile phone by the left hand, the terminal may turn down the volume of the right voice channel of the terminal; or when the current status of holding the terminal by the user is the state of holding the mobile phone by the right hand, the terminal may turn down the volume of the left voice channel of the terminal. Therefore, adverse impact of the voice information transmitted from the peer device on other users in the voice communication process of the terminal can be reduced, and a possibility of hearing content of the voice communication by the other users can be further reduced. This helps protect privacy of the user.

According to an eleventh aspect, this application provides a terminal, the terminal includes a left antenna and a right antenna, the left antenna is disposed on a left part of the terminal, the right antenna is disposed on a right part of the terminal, and the terminal includes a communications unit and a processing unit; the communications unit is configured to perform voice communication; and the processing unit is configured to: in the voice communication process of the communications unit, detect a current status of holding the terminal by a user; and when the current status of holding the terminal by the user is a state of holding the mobile phone by a left hand, increase transmit/receive power of the right antenna; or when the current status of holding the terminal by the user is a state of holding the mobile phone by a right hand, increase transmit/receive power of the left antenna.

In a possible design, the processing unit is further configured to: in the voice communication process of the communications unit, after detecting the current status of holding the terminal by the user, when the current status of holding the terminal by the user is the state of holding the mobile phone by the left hand, suppress the transmit/receive power of the left antenna; or when the current status of holding the terminal by the user is the state of holding the mobile phone by the right hand, suppress the transmit/receive power of the right antenna.

In another possible design, the processing unit is further configured to: after detecting the current status of holding the terminal by the user, when the current status of holding the terminal by the user is the state of holding the mobile phone by the left hand, turn up volume of a left voice channel of the terminal; or when the current status of holding the terminal by the user is the state of holding the mobile phone by the right hand, turn up volume of a right voice channel of the terminal.

According to a twelfth aspect, this application provides a terminal, the terminal includes a left antenna and a right antenna, the left antenna is disposed on a left part of the terminal, the right antenna is disposed on a right part of the terminal, and the terminal further includes a communications interface, a processor, and a memory; the memory is configured to store computer program code, where the computer program code includes a computer instruction; and when the processor executes the computer instruction, the communications interface is configured to perform voice communication; and the processor is configured to: in the voice communication process of the communications interface, detect a current status of holding the terminal by a user; and when the current status of holding the terminal by the user is a state of holding the mobile phone by a left hand, increase transmit/receive power of the right antenna; or when the current status of holding the terminal by the user is a state of holding the mobile phone by a right hand, increase transmit/receive power of the left antenna.

In a possible design, the processor is further configured to: in the voice communication process of the communications interface, after detecting the status of holding the terminal by the user, when the current status of holding the terminal by the user is the state of holding the mobile phone by the left hand, suppress the transmit/receive power of the left antenna; or when the current status of holding the terminal by the user is the state of holding the mobile phone by the right hand, suppress the transmit/receive power of the right antenna.

In another possible design, the processor is further configured to: after detecting the current status of holding the terminal by the user, when the current status of holding the terminal by the user is the state of holding the mobile phone by the left hand, turn up volume of a left voice channel of the terminal; or when the current status of holding the terminal by the user is the state of holding the mobile phone by the right hand, turn up volume of a right voice channel of the terminal.

According to a thirteenth aspect, this application provides a control device, the control device includes a processor and a memory, the memory is configured to store computer program code, the computer program code includes a computer instruction, and when the processor executes the computer instruction, the processor performs the method in the first aspect, the fourth aspect, the seventh aspect, the tenth aspect, or any possible design thereof.

According to a fourteenth aspect, this application provides a computer storage medium including an instruction, and when the computer instruction is run on a terminal, the terminal is enabled to perform the method in the first aspect, the fourth aspect, the seventh aspect, the tenth aspect, and any possible design thereof.

According to a fifteenth aspect, this application provides a computer program product, and when the computer program product is run on a computer, the computer is enabled to perform the method in the first aspect, the fourth aspect, the seventh aspect, the tenth aspect, and any possible design thereof.

It may be understood that, the terminals in the second aspect, the third aspect, the fifth aspect, the sixth aspect, the eighth aspect, the ninth aspect, the eleventh aspect, the twelfth aspect, and any possible design thereof, the control device in the thirteenth aspect, the computer storage medium in the fourteenth aspect, and the computer program product in the fifteenth aspect are all configured to perform the corresponding methods provided above. Therefore, for beneficial effects that the terminals, the control device, the computer storage medium, and the computer program product can achieve, refer to beneficial effects in the corresponding methods provided above. Details are not described again herein.

BRIEF DESCRIPTION OF DRAWINGS

FIG. 16A is a schematic diagram 10 of an example of a mobile phone interface according to this application;

FIG. 18A is a schematic diagram 11 of an example of a mobile phone interface according to this application;

DESCRIPTION OF EMBODIMENTS

Figure 1:
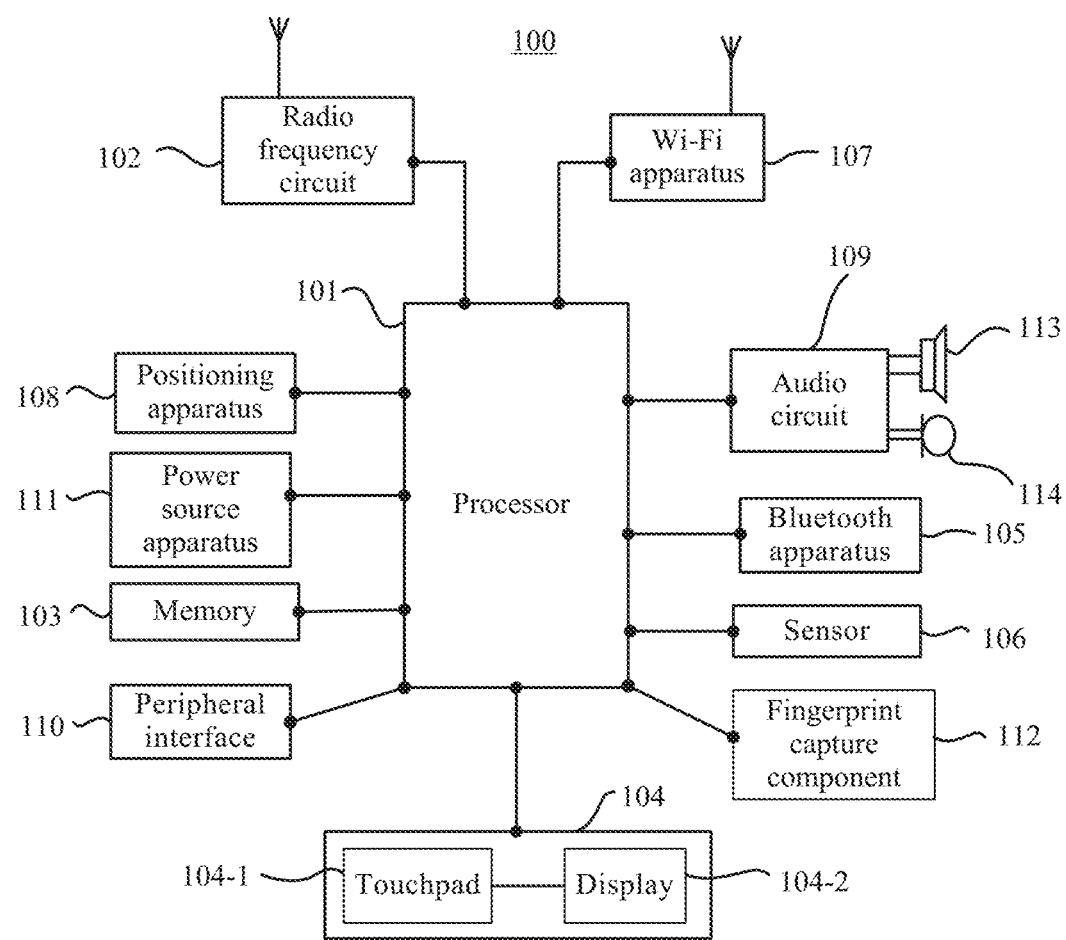
FIG. 1 is a schematic structural diagram of hardware of a terminal according to this application.

The terms "first" and "second" mentioned below are merely intended for description, and shall not be understood as an indication or implication of relative importance or an implicit indication of a quantity of indicated technical features. Therefore, a feature defined by "first" or "second" may explicitly or implicitly include one or more features. In the description of this application, unless otherwise stated, "a plurality of" means two or more than two.

A method provided in an embodiment of this application may be as follows: When detecting that a status of holding a terminal by a user undergoes a change satisfying a preset condition, the terminal automatically displays a control used to start a preset application or a preset function in the terminal; and then in response to a preset operation of the user on the control, the terminal may start the application corresponding to the preset operation or perform the function corresponding to the preset operation; or if the terminal does not detect a preset operation of the user on the control within a preset time after the terminal displays the control, the terminal may not continue to display the control, that is, the control may disappear on a display screen of the terminal.

In an embodiment of this application, a photographing method and a terminal are provided, and the method may be applied to a process of starting a "Camera" application by the terminal for photographing. Specifically, the terminal may detect a status of holding the terminal by a user, and when the terminal displays a first interface, the terminal displays, on the first interface in response to detecting that the status of holding the terminal by the user undergoes a change satisfying a preset condition, a photographing control used to turn on a camera, so that the user can operate the photographing control to start the "Camera" application for photographing. The terminal automatically detects the status of holding the terminal by the user, and displays the photographing control used to turn on the camera, so that the user can operate the photographing control to start the "Camera" application for photographing. This can simplify user operations for starting the "Camera" application on the terminal, improve human-machine interaction performance of the terminal, and further improve user experience.

It should be noted that, the terminal in this application includes the camera and a sensor, and the sensor is configured to detect the status of holding the terminal by the user. For example, the terminal may be a mobile phone (such as a mobile phone 100 shown in FIG. 1), a tablet computer, a personal computer (Personal Computer, PC), a personal digital assistant (personal digital assistant, PDA), a smartwatch, a netbook, a wearable electronic device, or the like. A specific form of the apparatus is not specifically limited in this application.

The method provided in this embodiment of this application may be performed by an apparatus for performing the method, for example, a photographing apparatus. The photographing apparatus may be the mobile phone 100 shown in FIG. 1; or the photographing apparatus may be a central processing unit (Central Processing Unit, CPU for short) in the terminal, or a control module that is in the terminal and is configured to perform the photographing method. In this embodiment of the present invention, the photographing method is described by using an example in which the terminal performs the photographing method.

As shown in FIG. 1, the mobile phone 100 is used as an example of the terminal. The mobile phone 100 may specifically include components such as a processor 101, a radio frequency (Radio Frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power source 111. The components may perform communication by using one or more communications buses or signal cables (not shown in FIG. 1). A person skilled in the art may understand that, a hardware structure shown in FIG. 1 does not constitute a limitation on the mobile phone. A quantity of components included in the mobile phone 100 may be greater or less than that shown in the figure, or some components are combined, or component arrangements are different.

The following describes each component of the mobile phone 100 in detail with reference to FIG. 1.

The processor 101 is a control center of the mobile phone 100. The processor 101 is connected to all parts of the mobile phone 100 by using various interfaces and lines, and executes various functions and data processing of the mobile phone 100 by running or executing an application program stored in the memory 103 and invoking data stored in the memory 103. In some embodiments, the processor 101 may include one or more processing units. In some embodiments of this application, the processor 101 may further include a fingerprint verification chip, configured to verify a captured fingerprint.

The radio frequency circuit 102 may be configured to receive and send radio signals. Particularly, after receiving downlink data from a base station, the radio frequency circuit 102 may send the downlink data to the processor 101 for processing, and send uplink data to the base station. Generally, the radio frequency circuit includes but is not limited to an antenna, at least one amplifier, a transceiver, a coupler, a low noise amplifier, a duplexer, or the like. In addition, the radio frequency circuit 102 may further communicate with another device through wireless communication. The wireless communication may be based on any communication standard or protocol, including but not limited to the global system for mobile communications, general packet radio service, code division multiple access, wideband code division multiple access, long term evolution, or the like.

The memory 103 is configured to store the application program and data. The processor 101 executes various functions and data processing of the mobile phone 100 by running the application program stored in the memory 103 and invoking data stored in the memory 103. The memory 103 mainly includes a program storage area and a data storage area. The program storage area may store an operating system, an application program required by at least one function (such as an audio playing function or an image reviewing function). The data storage area may store data (such as audio data or a phone book) that is created according to usage of the mobile phone 100. In addition, the memory 103 may include a high-speed random access memory (Random Access Memory, RAM), and may further include a non-volatile memory, for example, a magnetic disk storage device, a flash memory, or another non-volatile solid-state storage device. The memory 103 may store various operating systems. The memory 103 may be independent, and is connected to the processor 101 by using the communications bus; or the memory 103 may be integrated with the processor 101.

The touchscreen 104 may specifically include a touchpad 104-1 and a display 104-2.

The touchpad 104-1 may capture a touch event of a user of the mobile phone 100 on or near the touchpad (for example, an operation performed by the user by using any appropriate object such as a finger or a stylus on the touchpad 104-1 or near the touchpad 104-1), and send captured touch information to another component (for example, the processor 101). The touch event near the touchpad 104-1 may be referred to as a floating touch. The floating touch may be that the user does not need to directly touch the touchpad for selecting, moving, or dragging an object (for example, an icon), and that the user only needs to be located near the device for ease of performing a required function. In addition, the touchpad 104-1 may be a resistive touchpad, a capacitive touchpad, an infrared touchpad, or a surface acoustic wave touchpad.

The display (also referred to as a display screen) 104-2 may be configured to display information input by the user or information provided for the user and various menus of the mobile phone 100. The display 104-2 may be configured in a form of a liquid crystal display, an organic light-emitting diode, or the like. The touchpad 104-1 may cover the display 104-2. After detecting the touch event on or near the touchpad 104-1, the touchpad 104-1 transmits the touch event to the processor 101 to determine a type of the touch event. Then the processor 101 may provide a corresponding visual output on the display 104-2 based on the type of the touch event.

It should be noted that, although the touchpad 104-1 and the display screen 104-2 are used as two independent components to implement input and output functions of the mobile phone 100 in FIG. 1, the touchpad 104-1 and the display screen 104-2 may be integrated to implement the input and output functions of the mobile phone 100 in some embodiments. It may be understood that, the touchscreen 104 may be formed by a plurality of stacked layers of materials. Only the touchpad (layer) and the display screen (layer) are presented in this embodiment of this application. Other layers are not described in this embodiment of this application. In addition, the touchpad 104-1 may be configured on a front side of the mobile phone 100 in a form of a complete panel, and the display screen 104-2 may also be configured on the front side of the mobile phone 100 in a form of a complete panel. Therefore, a bezel-less structure can be implemented for the front side of the mobile phone.

In addition, the mobile phone 100 may further have a fingerprint recognition function. For example, a fingerprint recognizer 112 may be configured on a rear side (for example, below a rear-facing camera) of the mobile phone 100, or a fingerprint recognizer 112 is configured on a front side (for example, below the touchscreen 104) of the mobile phone 100. For another example, a fingerprint recognizer 112 may be configured in the touchscreen 104 to implement the fingerprint recognition function. To be specific, the fingerprint recognizer 112 may be integrated with the touchscreen 104 to implement the fingerprint recognition function of the mobile phone 100. In this case, the fingerprint recognizer 112 is configured in the touchscreen 104, and may be a part of the touchscreen 104, or may be configured in the touchscreen 104 in another manner. A main component of the fingerprint recognizer 112 in this embodiment of this application is a fingerprint sensor. The fingerprint sensor may use any type of sensing technology, including but not limited to an optical, capacitive, piezoelectric, or ultrasonic sensing technology, or the like.

The mobile phone 100 may further include the Bluetooth apparatus 105, configured to implement data exchange between the mobile phone 100 and another short-range device (for example, a mobile phone or a smartwatch). The Bluetooth apparatus in this embodiment of this application may be an integrated circuit, a Bluetooth chip, or the like.

The one or more sensors 106 include but are not limited to the foregoing sensor. For example, the one or more sensors 106 may further include a light sensor, a motion sensor, and another sensor. Specifically, the light sensor may include an ambient light sensor and a proximity sensor. The ambient light sensor may adjust luminance of the touchscreen 104 based on brightness of ambient light. The proximity sensor may turn off the display when the mobile phone 100 moves to an ear. As a type of motion sensor, an accelerometer sensor may detect acceleration magnitudes in all directions (generally tri-axis), and when the accelerometer sensor is stationary, may detect a magnitude and a direction of gravity, and may be used in a posture recognition application of the mobile phone (for example, switching between landscape orientation and portrait orientation, a related game, or magnetometer posture calibration), a function related to vibration recognition (for example, a pedometer or a stroke), or the like. For other sensors that may be configured for the mobile phone 100, such as a gyroscope, a barometer, a hygrometer, a thermometer, and an infrared sensor, details are not described herein.

The Wi-Fi apparatus 107 is configured to provide network access complying with a Wi-Fi related standard for the mobile phone 100. By using the Wi-Fi apparatus 107, the mobile phone 100 may access a Wi-Fi hotspot, and further help the user send and receive e-mails, browse web pages, access streaming media, and the like. The Wi-Fi apparatus 107 provides wireless broadband Internet access for the user. In other embodiments, the Wi-Fi apparatus 107 may also be used as a Wi-Fi wireless access point, and may provide Wi-Fi network access for another device.

The positioning apparatus 108 is configured to provide a geographic location for the mobile phone 100. It may be understood that, the positioning apparatus 108 may be specifically a receiver of a positioning system such as a global positioning system (Global Positioning System, GPS), a BeiDou navigation satellite system, or Russian GLONASS.

After receiving the geographic location information sent by the positioning system, the positioning apparatus 108 sends the information to the processor 101 for processing, or sends the information to the memory 103 for storage. Alternatively, in other embodiments, the positioning apparatus 108 may be a receiver of an assisted global positioning system (Assisted Global Positioning System, AGPS). The AGPS, as an assistance server, assists the positioning apparatus 108 in completing ranging and positioning services. In this case, the positioning assistance server communicates with the positioning apparatus 108 (that is, a GPS receiver) of a device such as the mobile phone 100 to provide positioning assistance.

Alternatively, in other embodiments, the positioning apparatus 108 may use a positioning technology based on a Wi-Fi hotspot. Because each Wi-Fi hotspot has a globally unique media access control (Media Access Control, MAC) address, the device may scan and capture broadcast signals of nearby Wi-Fi hotspots when Wi-Fi is enabled, and therefore can obtain MAC addresses broadcast by the Wi-Fi hotspots; the device sends, to a location server by using a wireless communications network, data (for example, the MAC addresses) that can identify the Wi-Fi hotspots; and the location server retrieves a geographic location of each Wi-Fi hotspot, calculates the geographic location of the device with reference to strength of the Wi-Fi broadcast signals, and sends the geographic location to the positioning apparatus 108 of the device.

The audio circuit 109, a speaker 113, and a microphone 114 may provide an audio interface between the user and the mobile phone 100. The audio circuit 109 may convert received audio data into an electrical signal and then transmit the electrical signal to the speaker 113, and the speaker 113 converts the electrical signal into an audio signal for outputting. In addition, the microphone 114 converts a captured audio signal into an electrical signal, and the audio circuit 109 converts the received electrical signal into audio data and then outputs the audio data to the RF circuit 102; and then the audio data is transmitted to another mobile phone, or the audio data is output to the memory 103 for further processing.

The peripheral interface 110 is configured to provide various interfaces for external input/output devices (for example, a keyboard, a mouse, an external display, an external memory, and a subscriber identity module card). For example, the peripheral interface is connected to the mouse by using a universal serial bus (Universal Serial Bus, USB) interface, or connected, by using a metal contact in a subscriber identity module card slot, to a subscriber identity module (Subscriber Identity Module, SIM) card provided by a telecommunications operator. The peripheral interface 110 may be configured to couple the external input/output peripheral device to the processor 101 and the memory 103.

In this embodiment of the present invention, the mobile phone 100 may communicate with another device in a device group by using the peripheral interface 110, for example, may receive, by using the peripheral interface 110, displayed data sent by another device and display the data. This is not limited in this embodiment of the present invention.

The mobile phone 100 may further include the power source apparatus 111 (such as a battery and a power management chip) supplying power to each component. The battery may be logically connected to the processor 101 by using the power management chip, so that functions such as charge and discharge management and power consumption management are implemented by using the power source apparatus 111.

Although not shown in FIG. 1, the mobile phone 100 may further include a camera (a front-facing camera and/or a rear-facing camera), a flash, a micro projection apparatus, a near field communications (Near Field Communications, NFC) apparatus, and the like. Details are not described herein.

All methods in the following embodiments may be implemented in the mobile phone 100 having the foregoing hardware structure.

Figure 2:
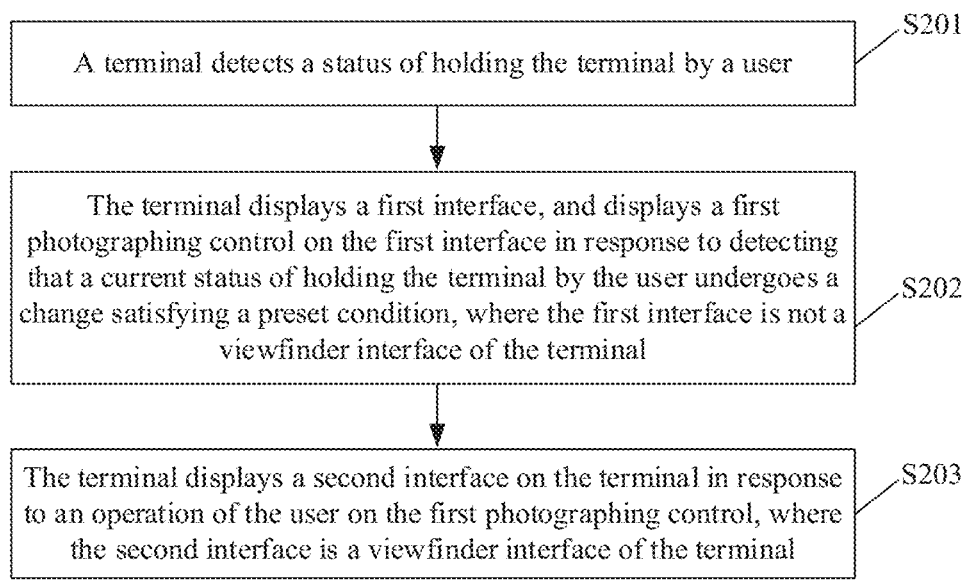
FIG. 2 is a flowchart 1 of a photographing method according to this application.

An embodiment of this application provides a photographing method. The photographing method may be applied to a terminal, the terminal includes a camera and one or more sensors, and the one or more sensors are configured to detect a status of holding the terminal by a user. As shown in FIG. 2, the photographing method includes S201 to S203.

S201. A terminal detects a status of holding the terminal by a user.

The terminal may detect, by using a sensor in the terminal, the status of holding the terminal by the user.

S202. The terminal displays a first interface, and displays a first photographing control on the first interface in response to detecting that a current status of holding the terminal by the user undergoes a change satisfying a preset condition, where the first interface is not a viewfinder interface of the terminal.

The first interface in this embodiment of this application may be an interface displayed when the terminal is in a screen-on state. The screen-on state may include a state of displaying a locked-screen interface by the terminal, a state of displaying a home screen (that is, an interface including a plurality of application icons) by the terminal, a state of displaying a display interface of any application by the terminal, or the like. This is not limited in this application.

For example, the terminal is the mobile phone 100 shown in FIG. 1. The first interface may be a locked-screen interface 301 shown in FIG. 3A; or the first interface may be a home screen 302 shown in FIG. 3B; or the first interface may be an interface 303 of a "Browser" application shown in FIG. 3C. Certainly, the first interface may also be a display interface of the mobile phone 100 for displaying another application (such as a "WeChat" application or an "Alipay" application). This is not limited in this embodiment of this application.

The one or more sensors in this embodiment of this application may determine, by detecting that the terminal is rotated, or that the terminal moves forward relatively to the user, or that the terminal moves upward relatively to a horizontal line, whether the status of holding the terminal by the user undergoes the change satisfying the preset condition. Specifically, the terminal may detect a motion parameter of the terminal; then determine, based on the motion parameter, whether the terminal is rotated, or whether the terminal moves forward relatively to the user, or whether the terminal moves upward relatively to the horizontal line; and finally determine, based on a determining result, whether the status of holding the terminal by the user undergoes the change satisfying the preset condition. For example, as shown in Table 1, this application provides a table of changes of statuses of holding the terminal.

TABLE 1

Table of changes of statuses of holding the terminal

| | Condition | Rotated | Moving forward | Moving upward | Icon status |
|---|---|---|---|---|---|
| Case of condition satisfaction | 1 | Yes | Yes | Yes | Normally displayed |
| | 2 | Yes | Yes | Yes, but an amplitude is insufficient | A displayed icon is small, and transparency is high |
| | 3 | Yes | Yes, but an amplitude is insufficient | Yes | A displayed icon is small, and transparency is high |
| | 4 | Yes | No, or within an anti-jitter range | Yes | Not displayed |
| | 5 | Yes | Yes | No, or within an anti-jitter range | Not displayed |
| | 6 | Yes | No, or within an anti-jitter range | No, or within an anti-jitter range | Not displayed |
| | 7 | No | Yes | Yes | Not displayed |

Referring to Table 1, as shown in the case 1, when the motion parameter detected by the sensor in the terminal indicates that the terminal is "rotated", "moving forward", and "moving upward", the first photographing control may be normally displayed.

As shown in the case 2, when the motion parameter detected by the sensor in the terminal indicates that the terminal is "rotated", "moving forward", and "moving upward", but an upward amplitude is insufficient (that is, the upward motion amplitude is less than a first preset amplitude)", the first photographing control may be normally displayed but is relatively small, and transparency of the first photographing control is relatively high (that is, transparency of the first control displayed in the case 2 is higher than that of the first control displayed in the case 1).

As shown in the case 3, when the motion parameter detected by the sensor in the terminal indicates that the terminal is "rotated", "moving forward (that is, a forward motion amplitude is less than a second preset amplitude)", and "moving upward", the first photographing control may be normally displayed but is relatively small, and transparency of the first photographing control is relatively high.

As shown in the case 4, when the sensor in the terminal detects that the terminal is "rotated", "not moving forward, but a forward motion amplitude is within an anti jitter range", and "moving upward", the terminal does not display the first photographing control on the first interface.

Likewise, the terminal may determine, based on the cases 5 and 6 shown in Table 1, whether the terminal displays the first photographing control on the first interface, and when the terminal needs to display the first photographing control, determine a size and transparency of the to-be-displayed first photographing control.

It should be noted that, in this embodiment of this application, a method for determining, by the terminal, whether the status of holding the terminal by the user undergoes the change satisfying the preset condition and a determining condition include but are not limited to descriptions in the foregoing embodiment. Other determining methods and determining conditions are not described herein in this embodiment of this application.

In addition, the foregoing determining may occur when neither a front-facing camera nor a rear-facing camera is turned on. In addition, the foregoing determining may occur when it is determined that a current scenario is a non-game scenario, that is, it is determined that the user is currently not playing a game, to exclude possible incorrect determining.

Figure 4A:
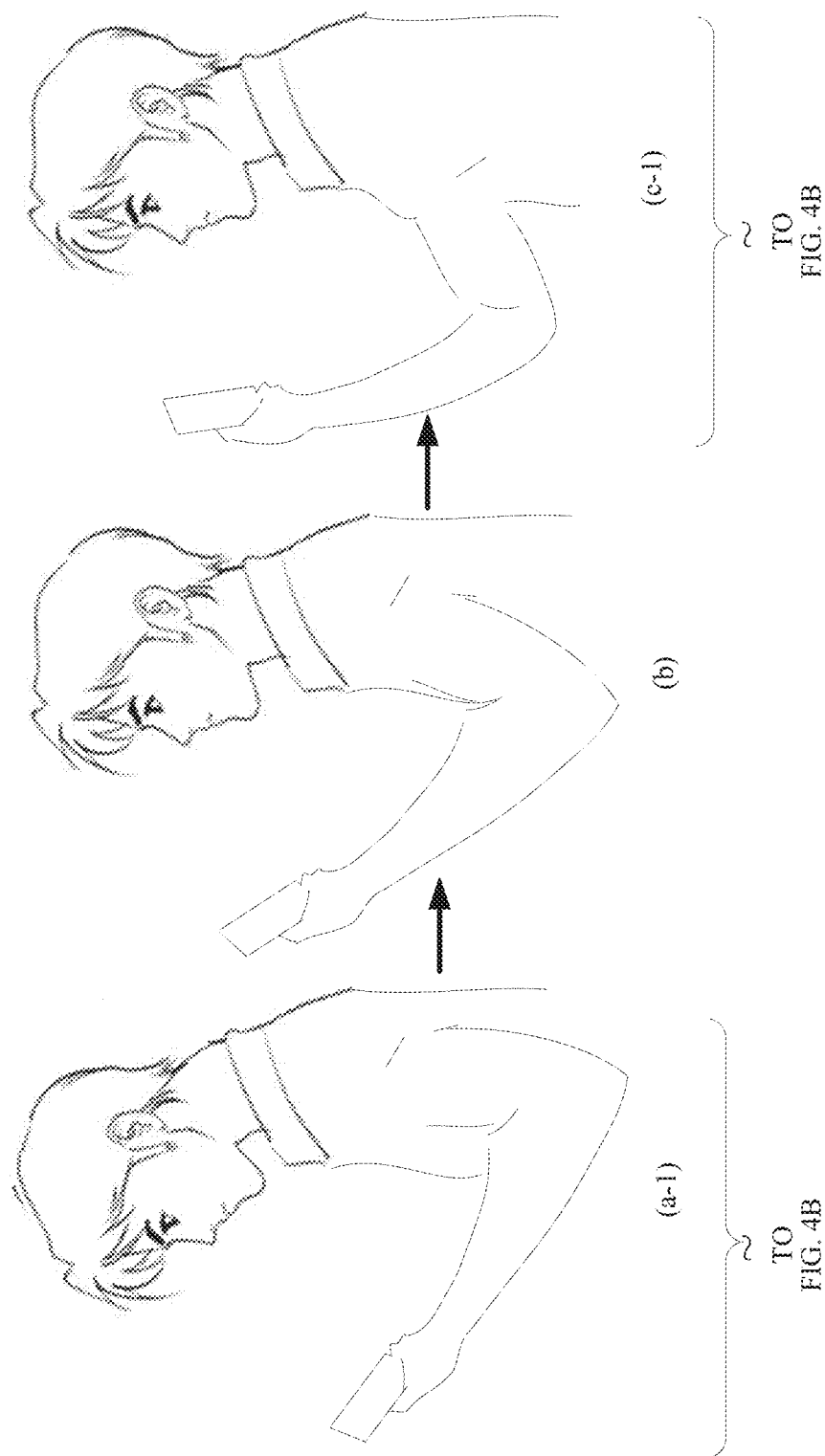
FIG. 4A IS a schematic diagram 2 of an example of a mobile phone interface according to this application.
Figure 4B:
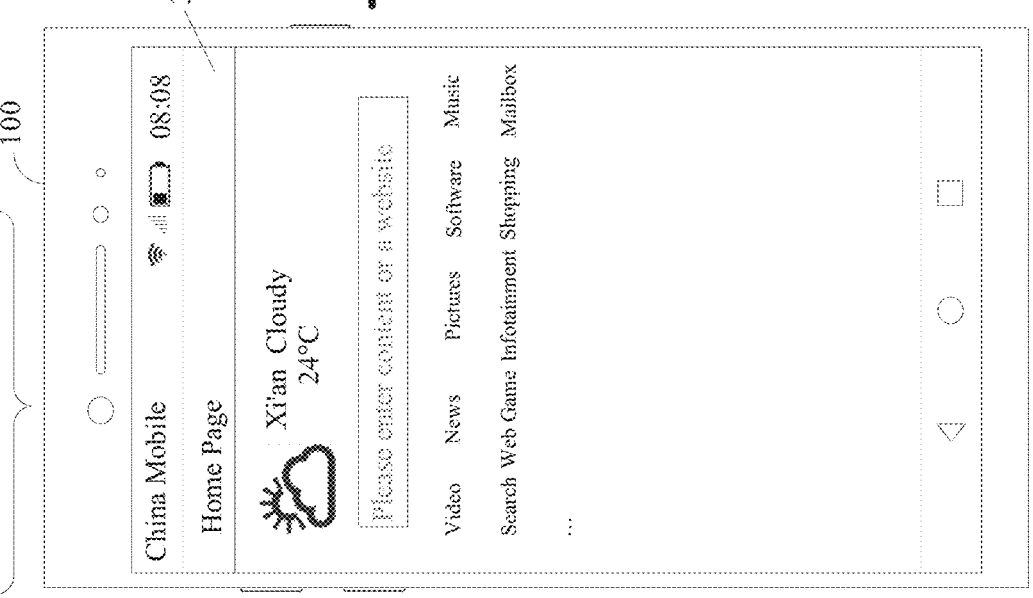
FIG. 4B is another schematic diagram 2 of an example of a mobile phone interface according to this application.

Generally, for example, the terminal is a mobile phone 100 shown in FIG. 4A and FIG. 4B. When the user uses the mobile phone 100 for photographing, as shown in (a-1) in FIG. 4A, the user may pick up the mobile phone 100; then as shown in (a-1) in FIG. 4A to (b) in FIG. 4A, the user may gradually raise an arm until the mobile phone is approximately vertical to the ground as shown in (c-1) in FIG. 4A. In this case, the user may start to take a photo.

For example, in this embodiment, "a current status of holding the terminal by the user undergoes a change satisfying a preset condition" may specifically include: an included angle between a display screen of the terminal and a horizontal screen line is within a preset range after the sensor detects that the terminal is rotated and moves upward.

Figure 3A:
FIG. 3A is a schematic diagram 1 of an example of a mobile phone interface according to this application.
Figure 3B:
FIG. 3B is another schematic diagram 1 of an example of a mobile phone interface according to this application.
Figure 3C:
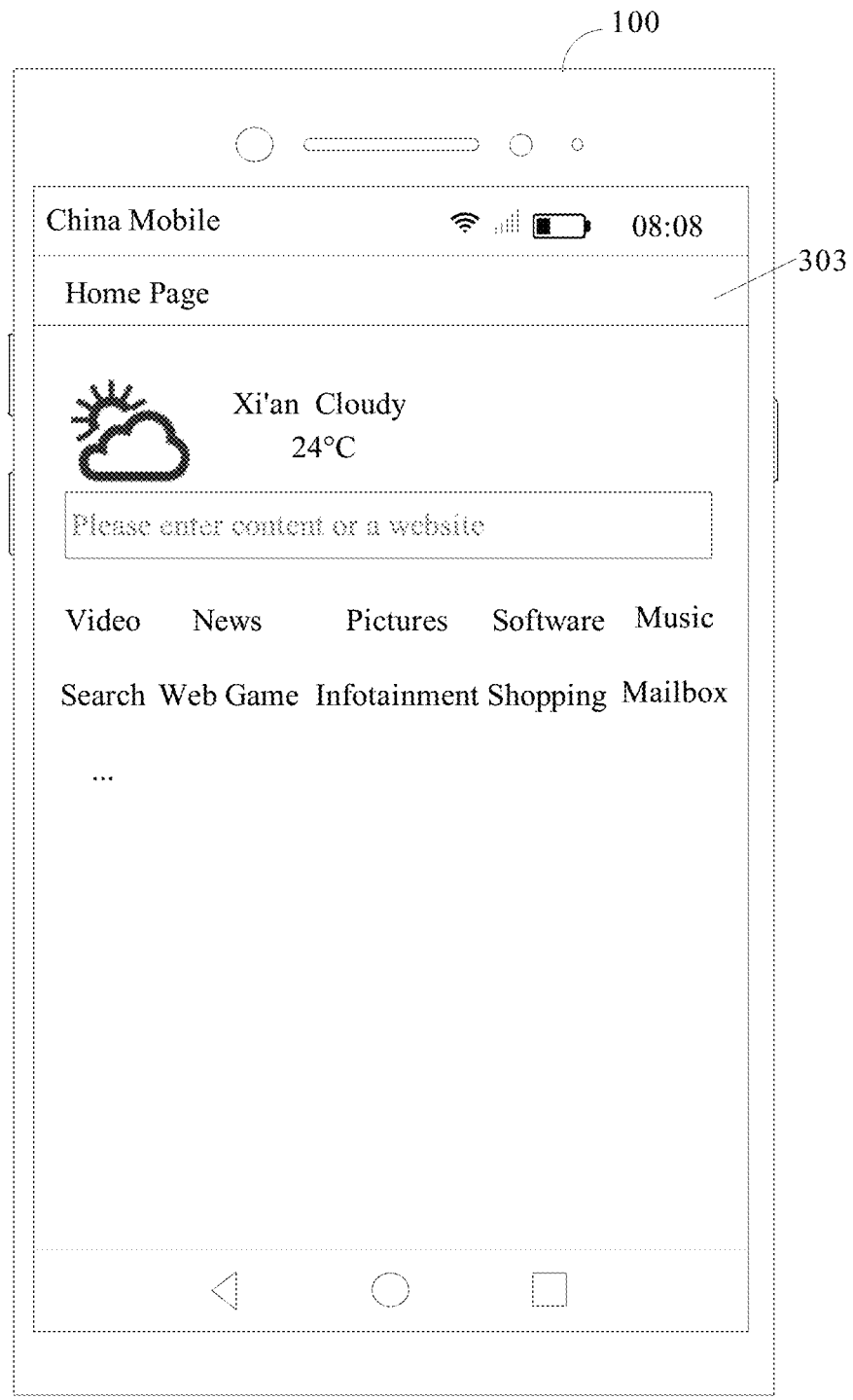
FIG. 3C is another schematic diagram 1 of an example of a mobile phone interface according to this application.

For example, when the mobile phone 100 displays the first interface shown in FIG. 3C, and the status of holding the mobile phone 100 by the user undergoes a change shown in (a-1) in FIG. 4A to (b) in FIG. 4A to (c-1) in FIG. 4A (that is, undergoes the change satisfying the preset condition), the mobile phone 100 may display the first photographing control on the first interface.

It should be noted that, the change satisfying the preset condition in this embodiment of this application includes but is not limited to the change shown in (a-1) in FIG. 4A to (b) in FIG. 4A to (c-1) in FIG. 4A. Because different users have different photographing habits, the terminal may collect statistics about status change parameters captured by the sensor in photographing processes of most or all users using the terminal, and determine changes of the status change parameters as changes satisfying the preset condition. Therefore, the terminal displays the first interface, and when a change of the status change parameters captured by the sensor in the terminal is a change satisfying the preset condition, the terminal may determine, in response, that a possibility that the user wants to take a photo by using the terminal is relatively high, and may display the first photographing control on the first interface.

For example, the first interface is the interface 303 of the "Browser" application displayed by the mobile phone 100, as shown in FIG. 3C. When the user holds the mobile phone 100 in a gesture shown in (a-1) in FIG. 4A, the mobile phone 100 displays the first interface 303 shown in (a-2) in FIG. 4B. As shown in (a-1) in FIG. 4A to (b) in FIG. 4A to (c-1) in FIG. 4A, the gesture of holding the mobile phone 100 by the user changes, and in a change process of the gesture of holding the mobile phone 100 by the user, the mobile phone 100 detects that the current status of holding the mobile phone 100 by the user undergoes the change satisfying the preset condition. In this case, as shown in (c-2) in FIG. 4B, the mobile phone 100 may display a first photographing control 402 on a first interface 401, and the first photographing control 402 is used to turn on a camera of the mobile phone 100.

It should be emphasized that the first interface in this embodiment of this application is not a viewfinder interface of the terminal. For example, the first interface may be the first interface 401 shown in (c-2) in FIG. 4B, (a) in FIG. 5, or (a) in FIG. 7, or a first interface 801 shown in FIG. 8A, or a first interface 803 shown in FIG. 8B.

Optionally, the first photographing control in this embodiment of this application may be displayed on the first interface in a floating manner. The terminal may display, on the first interface in response to a moving operation of the user on the first photographing control, dynamic images of the first photographing control that dynamically moves along a moving track of the moving operation. For example, a position of the first photographing control 402 on the first interface 401 shown in (c-2) in FIG. 4B is different from a position of the first photographing control 402 on the first interface 401 shown in (a) in FIG. 5.

S203. The terminal displays a second interface on the terminal in response to an operation of the user on the first photographing control, where the second interface is a viewfinder interface of the terminal.

In this embodiment of this application, the operation of the user on the first photographing control may be any one of operations of the user on the first photographing control, such as a tap operation, a double-tap operation, and a touch and hold operation. This is not limited in this embodiment of this application.

Figure 5:
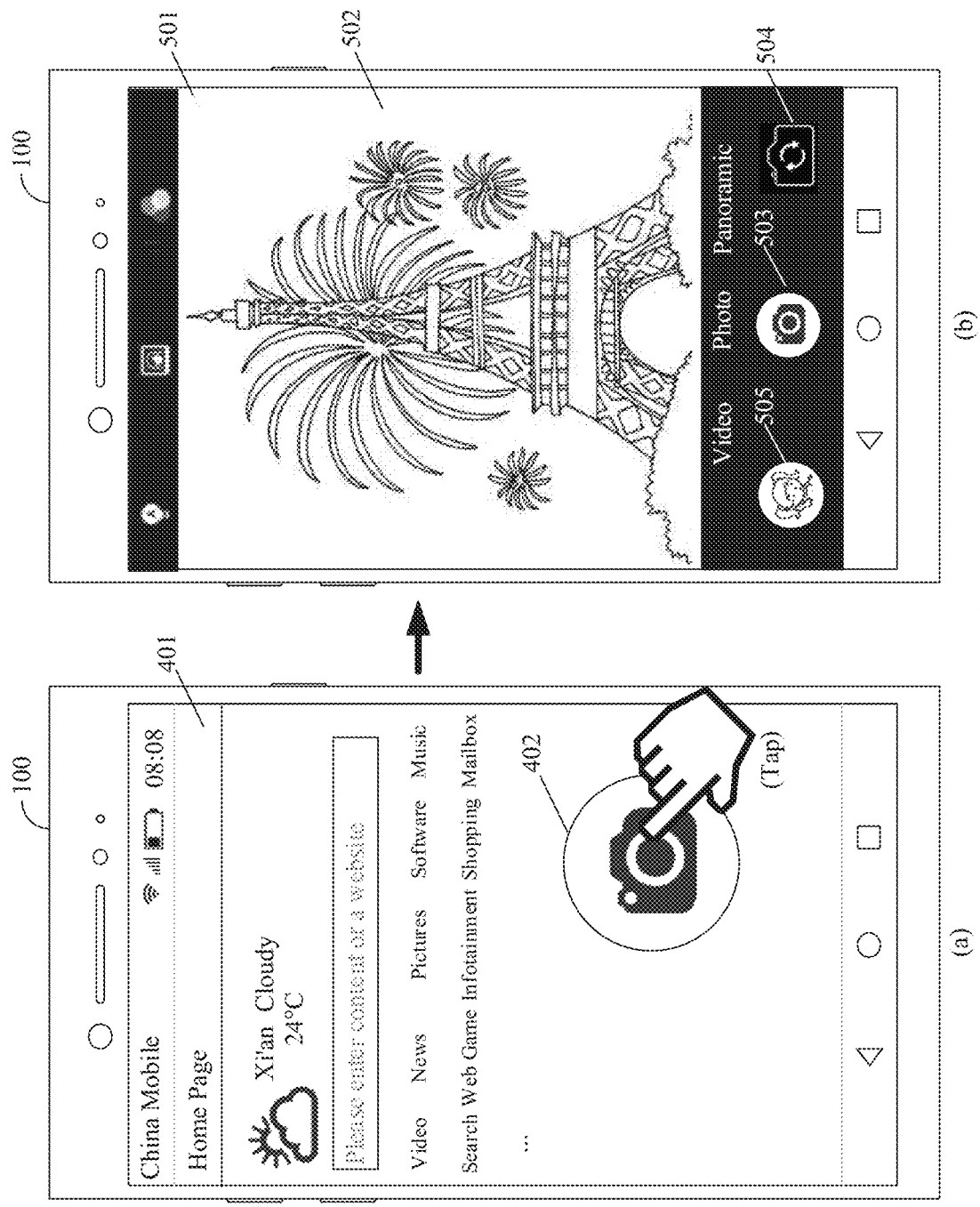
FIG. 5 is a schematic diagram 3 of an example of a mobile phone interface according to this application.

For example, as shown in (a) in FIG. 5, the operation of the user on the first photographing control is a tap operation. After the user taps the first photographing control 402 shown in (a) in FIG. 5, the mobile phone 100 may display, in response to the tap operation of the user on the first photographing control 402, a second interface 501 shown in (b) in FIG. 5. The second interface 501 shown in (b) in FIG. 5 includes a viewfinder frame 502, a camera switch key 504, a photographing key 503, and a gallery key 505.

The viewfinder frame 502 is used to display a preview image captured by the rear-facing camera or the front-facing camera of the terminal; the camera switch key 504 is used to trigger the terminal to switch between the front-facing camera and the rear-facing camera to capture an image; the photographing key 503 is used to control the terminal to save the preview image captured by the rear-facing camera or the front-facing camera and displayed in the viewfinder frame 502; and the gallery key 505 is used to view an image stored in the terminal. When a default camera of the terminal is the rear-facing camera, the viewfinder frame 502 may display the preview image captured by the rear-facing camera shown in (b) in FIG. 5.

Optionally, in S203, when the operation of the user on the first photographing control may be a different user operation such as a tap operation, a double-tap operation, or a touch and hold operation, the second interface may also be a photographing interface in a different photographing mode of the terminal. To be specific, the second interface is a photographing interface of the terminal in a photographing mode corresponding to the foregoing operation. Photographing modes of the terminal may include at least a photographing mode using the rear-facing camera, a self-photographing mode, a panoramic mode, and a video mode. Certainly, the photographing modes in this embodiment of this application include but are not limited to the photographing mode using the rear-facing camera, the self-photographing mode, the panoramic mode, and the video mode. Other photographing modes are not described herein in this embodiment of this application.

Figure 6:
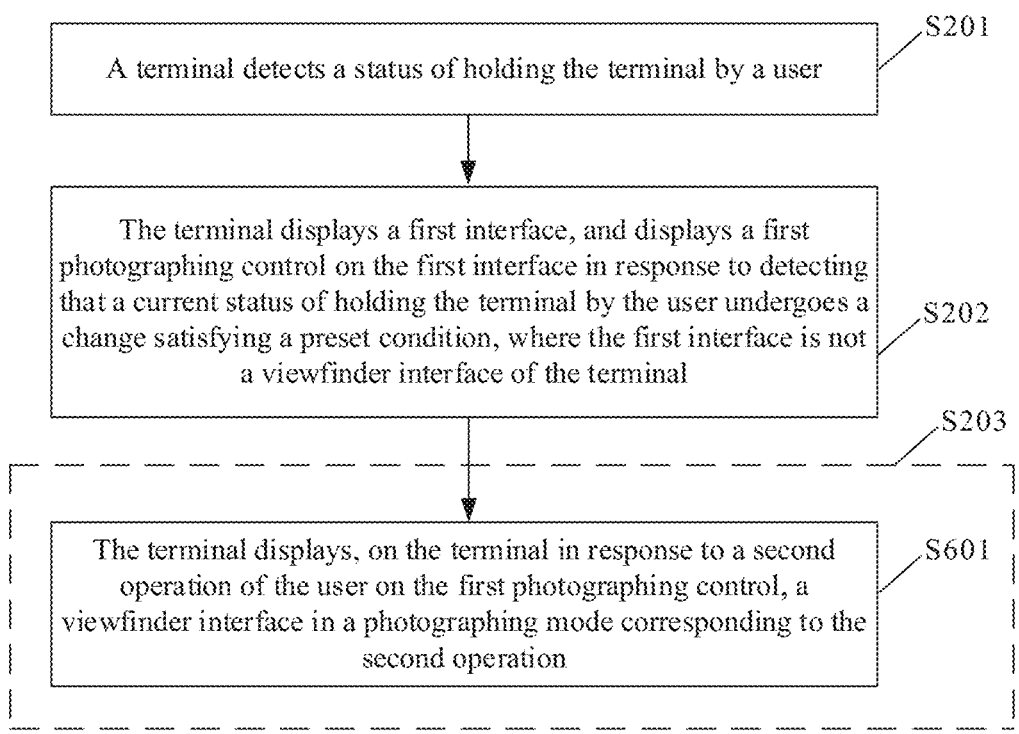
FIG. 6 is a flowchart 2 of a photographing method according to this application.

Specifically, as shown in FIG. 6, S203 shown in FIG. 2 may be replaced with S601.

S601. The terminal displays, in response to a second operation of the user on the first photographing control, a viewfinder interface in a photographing mode corresponding to the second operation.

The second operation in S601 is the operation of the user on the first photographing control in S203. The second operation may be a different user operation such as a tap operation, a double-tap operation, or a touch and hold operation. The photographing mode corresponding to the second operation is any one of the photographing mode using the rear-facing camera, the self-photographing mode, the panoramic mode, and the video recording mode.

For example, when the second operation is a tap operation, the second interface may be a photographing interface of the terminal in the photographing mode using the rear-facing camera. The photographing mode using the rear-facing camera is a mode of using the rear-facing camera by the terminal to capture an image. For example, after the user taps the first photographing control 402 shown in (a) in FIG. 5, the mobile phone 100 may display, in response to the tap operation of the user on the first photographing control 402, the second interface 501 shown in (b) in FIG. 5. The second interface 501 shown in (b) in FIG. 5 is the photographing interface of the terminal in the photographing mode using the rear-facing camera.

Figure 7:
FIG. 7 is a schematic diagram 4 of an example of a mobile phone interface according to this application.

When the second operation is a touching and holding operation, the second interface may be a photographing interface of the terminal in the self-photographing mode. The self-photographing mode in this application is a mode of using the front-facing camera by the terminal to capture an image. For example, after the user touches and holds the first photographing control 402 shown in (a) in FIG. 7, the mobile phone 100 may display, in response to the touch and hold operation of the user on the first photographing control 402, a second interface 701 shown in (b) in FIG. 7. The second interface 701 shown in (b) in FIG. 7 is the photographing interface of the terminal in the self-photographing mode. A viewfinder frame shown in (b) in FIG. 7 displays a profile picture of the user. When the second operation is a double-tap operation, the second interface may be a photographing interface of the terminal in the panoramic mode, which is not shown in the figure.

In the photographing method provided in this embodiment of this application, when the terminal is in the screen-on state, and detects that the status of holding the terminal by the user undergoes the change satisfying the preset condition, the terminal displays, on the first interface, the photographing control used to turn on the camera, so that the user can operate the photographing control to start a "Camera" application for photographing. When the terminal is in the screen-on state, and automatically detects that the status of holding the terminal by the user undergoes the change satisfying the preset condition, the terminal displays the photographing control used to turn on the camera, so that the user can operate the photographing control to start the "Camera" application for photographing. This can simplify user operations for starting the "Camera" application on the terminal, improve human-machine interaction performance of the terminal, and further improve user experience.

Figure 8A:
FIG. 8A is a schematic diagram 5 of an example of a mobile phone interface according to this application.
Figure 8B:
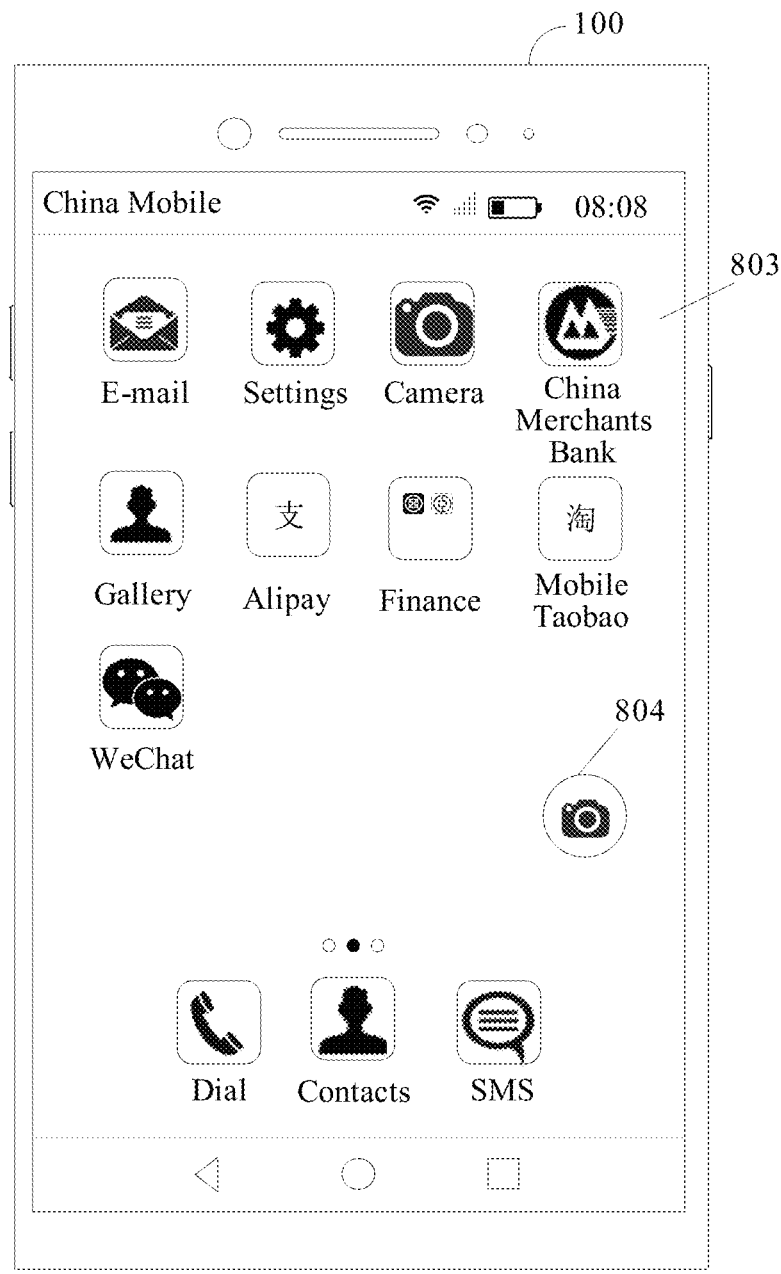
FIG. 8B is another schematic diagram 5 of an example of a mobile phone interface according to this application.

Further, to prevent the terminal from displaying the first photographing control on the first interface for a long time due to an unintentional operation of the user, the terminal may start timing from displaying the first photographing control. If the terminal does not receive a first operation of the user on the first photographing control within a preset time, the terminal may display the first photographing control that gradually scales down, until the first photographing control is not displayed, that is, until the first photographing control disappears. For example, as shown in FIG. 8A, the mobile phone 100 displays a first photographing control 802 on a home screen 801 including a plurality of application icons. Because no operation of the user on the first photographing control is received within a preset time starting from displaying the first photographing control 802 by the mobile phone 100 on the home screen 801 (that is, the first interface), the mobile phone 100 may display a first interface 803 including a first photographing control 804, as shown in FIG. 8B. In comparison with the first photographing control 802 shown in FIG. 8A, the first photographing control 804 shown in FIG. 8B is smaller.

In this application, after the terminal displays the first photographing control on the first interface, if the terminal does not receive the first operation of the user on the first photographing control within the preset time, it indicates that an action of holding the terminal by the user may be an unintentional operation of the user. To prevent the terminal from displaying the first photographing control on the first interface due to an unintentional operation of the user, the terminal may display the first photographing control that gradually scales down, until the first photographing control is not displayed.

It may be understood that, some time is needed from detecting, by the terminal in the screen-on state, that the current status of holding the terminal by the user undergoes the change satisfying the preset condition, to displaying, by the terminal, the first interface including the first photographing control, and then displaying the viewfinder interface in response to the operation of the user on the first photographing control. However, in some scenarios, the user may want to record some fleeting images, but when the terminal interacts with the user to perform the foregoing operation, the images that the user wants to shoot possibly no longer exist, and user experience is affected.

Figure 9:
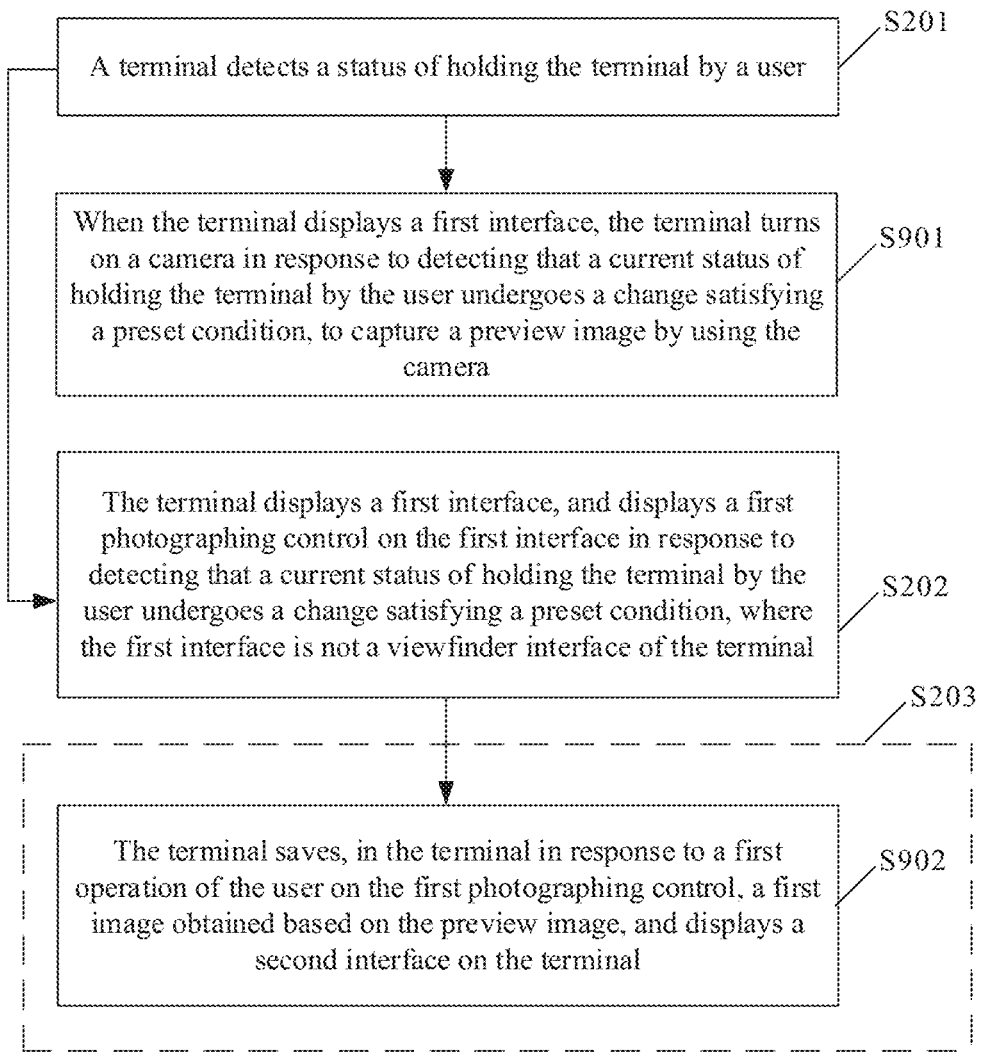
FIG. 9 is a flowchart 3 of a photographing method according to this application.

For this case, in this embodiment of this application, when the terminal may be in the screen-on state (that is, the terminal displays the first interface), the terminal may turn on the camera in the terminal in response to detecting that the current status of holding the terminal by the user undergoes the change satisfying the preset condition, to capture a preview image by using the camera. Specifically, as shown in FIG. 9, after S201 shown in FIG. 2, the method in this embodiment of this application may further include S901.

S901. When the terminal displays the first interface, the terminal turns on the camera in response to detecting that the current status of holding the terminal by the user undergoes the change satisfying the preset condition, to capture a preview image by using the camera.

In this embodiment of this application, when the terminal displays the first interface, the terminal may directly turn on the camera in response to detecting that the current status of holding the terminal by the user undergoes the change satisfying the preset condition, and start to capture the preview image by using the camera. In addition, in response to detecting that the current status of holding the terminal by the user undergoes the change satisfying the preset condition, the terminal may display the first interface including the first photographing control. To be specific, when displaying the first interface, the terminal may turn on the camera to capture the preview image, instead of starting to capture the preview image in response to the operation of the user on the first photographing control on the first interface only after the first interface is displayed. Therefore, the terminal can capture images in a time period in which the terminal displays the first interface, receives the operation of the user on the first photographing control, and displays the second interface.

It should be emphasized that, when the terminal displays the first interface, even if the terminal turns on the camera to capture the preview image, a viewfinder frame (the viewfinder frame 502 shown in (b) in FIG. 5) of the camera is not displayed on the first interface. In other words, even if the terminal has turned on the camera for viewfinder setting and photographing, because the terminal does not display the viewfinder frame, the user cannot see, on the display screen of the terminal, the image captured or taken by the terminal by using the camera.

Because the terminal has turned on the camera when displaying the first interface, and has captured the preview image by using the camera, the terminal may save, in response to the operation of the user on the first photographing control on the first interface, the image captured by the camera, and display the second interface. In addition, the terminal may enable an image recognition function when turning on the camera. Therefore, when the first interface is displayed, actually the terminal has performed image recognition/analysis on the image captured by the camera. Therefore, an image recognition result can be obtained immediately after the user performs the first operation. This helps increase an image recognition speed, and is particularly helpful for some motion scenarios or snap scenarios. Specifically, as shown in FIG. 9, S203 shown in FIG. 2 may be replaced with S902.

S902. The terminal saves, in the terminal in response to the first operation of the user on the first photographing control, a first image obtained based on the preview image, and displays the second interface on the terminal.

The first operation in this embodiment of this application may be different from the second operation. For example, when the second operation is a tap operation, a touch and hold operation, or a double-tap operation, the first operation may be a slide-up operation or a slide-down operation of the user on the first photographing control.

For example, the first image may be at least one of preview images captured by the camera or a video image including a plurality of images. The terminal may analyze the preview images captured by the camera, to extract the first image from the preview images captured by the camera and save the first image.

When the first operation is a different operation, the first image may be different image content. For example, when the first operation is a slide-up operation of the user on the first photographing control, the first image saved by the terminal may be an image whose definition is the highest in the preview images captured by the camera; or when the first operation is a slide-down operation of the user on the first photographing control, the first image saved by the terminal may be a video image including a plurality of preview images captured by the camera.

Certainly, the first operation and the second operation may also be the same. A photographing mode corresponding to the first operation is any one of the photographing mode using the rear-facing camera, the self-photographing mode, the panoramic mode, and the video recording mode. When the photographing mode corresponding to the first operation is any one of the photographing mode using the rear-facing camera, the self-photographing mode, and the panoramic mode, the first image includes one or more images in the preview images; or when the photographing mode corresponding to the first operation is the video recording mode, the first image is a video image captured by the camera and including a plurality of preview images.

In this application, when displaying the first interface, the terminal may turn on the camera to capture the preview image, instead of starting to capture the preview image in response to the operation of the user on the first photographing control on the first interface only after the first interface is displayed. Therefore, the terminal can capture images in the time period in which the terminal displays the first interface, receives the operation of the user on the first photographing control, and displays the second interface.

Optionally, to facilitate user operations, the terminal may further identify whether the terminal is currently held by a left hand of the user or held by a right hand of the user, and then display the first photographing control in an area that facilitates the user operations. Specifically, S202 may include S202a.

S202a. When the terminal displays the first interface, in response to detecting that the current status of holding the terminal by the user undergoes the change satisfying the preset condition, the terminal displays the first photographing control in a high-frequency touch area on a left side of the first interface if the terminal is held by the left hand of the user, or displays the first photographing control in a high-frequency touch area on a right side of the first interface if the terminal is held by the right hand of the user.

The high-frequency touch area in this application is a touch area in which a frequency or quantity of user operations is higher than a preset threshold on the interface of the terminal. The terminal may determine, by using sensors, whether the terminal is held by the left hand of the user or held by the right hand of the user. For example, the sensors may be light sensors disposed on a left side edge and a right side edge of the terminal. When the terminal is held by the left hand of the user, intensity of light captured by the sensor on the right side edge is weaker than intensity of light captured by the sensor on the left side edge, and the terminal may determine that the terminal is held by the left hand of the user.

Figure 10:
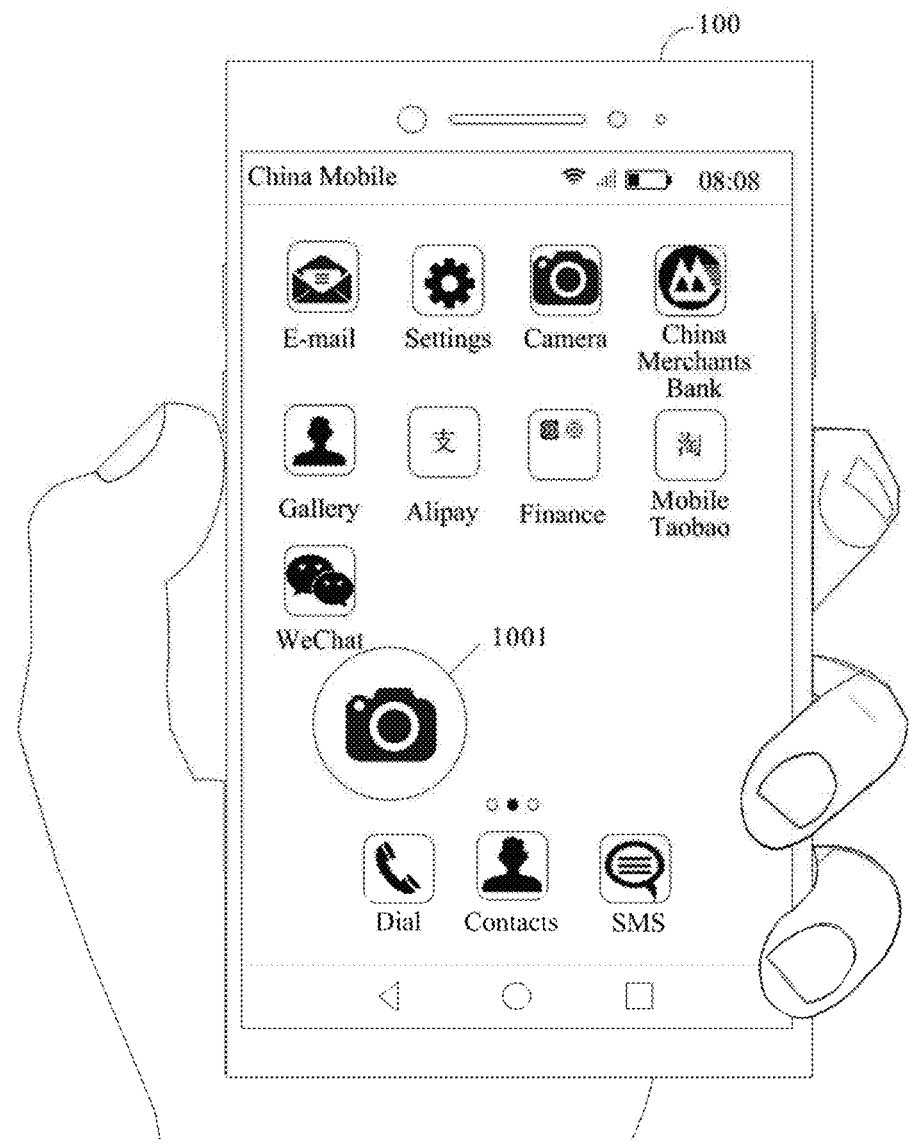
FIG. 10 is a schematic diagram 6 of an example of a mobile phone interface according to this application.

For example, as shown in FIG. 10, it is assumed that the mobile phone 100 is held by the left hand of the user. When the mobile phone 100 displays the first interface, in response to detecting that the current status of holding the mobile phone 100 by the user undergoes the change satisfying the preset condition, the mobile phone 100 may display a first photographing control 1001 in the high-frequency touch area on the left side of the first interface.

In this embodiment of this application, the terminal may display the first photographing control in the high-frequency touch area on the left side of the first interface when the left hand of the user holds the terminal, or display the first photographing control in the high-frequency touch area on the right side of the first interface when the right hand of the user holds the terminal, so that the user can operate the first photographing control more conveniently and comfortably, and user experience can be improved.

Figure 11:
FIG. 11 is a schematic diagram 7 of an example of a mobile phone interface according to this application.

Further, the second interface may include a second photographing control. For example, the second interface shown in FIG. 11 may include a second photographing control 1101. The second photographing control may be used to control the terminal to perform photographing, and functions as a photographing shutter, that is, the photographing key 503 shown in FIG. 11.

It may be understood that, when a touchscreen of the terminal is relatively large, the user cannot conveniently tap the photographing shutter for photographing by using a single hand. In this case, the terminal may display the second photographing control on the second interface, and the user can control, by operating the second photographing control, the terminal to save an image captured by the camera.

Figure 12:
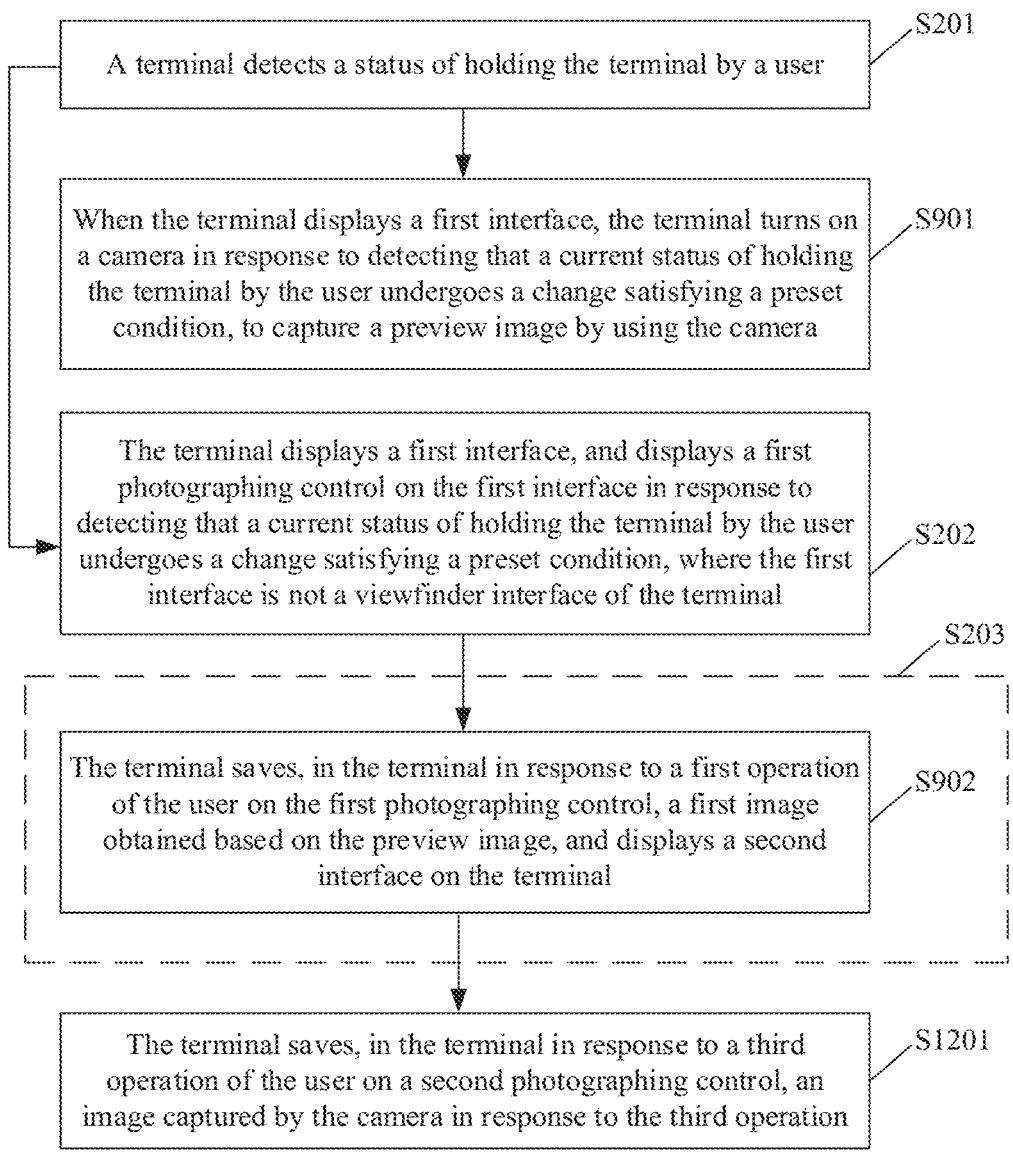
FIG. 12 is a flowchart 4 of a photographing method according to this application.

Specifically, after S203, the method in this application may further include S1201. For example, as shown in FIG. 12, after S902 (that is, S203) shown in FIG. 9, the method in this application may further include S1201.

S1201. The terminal saves, in the terminal in response to a third operation of the user on the second photographing control, an image captured by the camera in response to the third operation.

Figure 13:
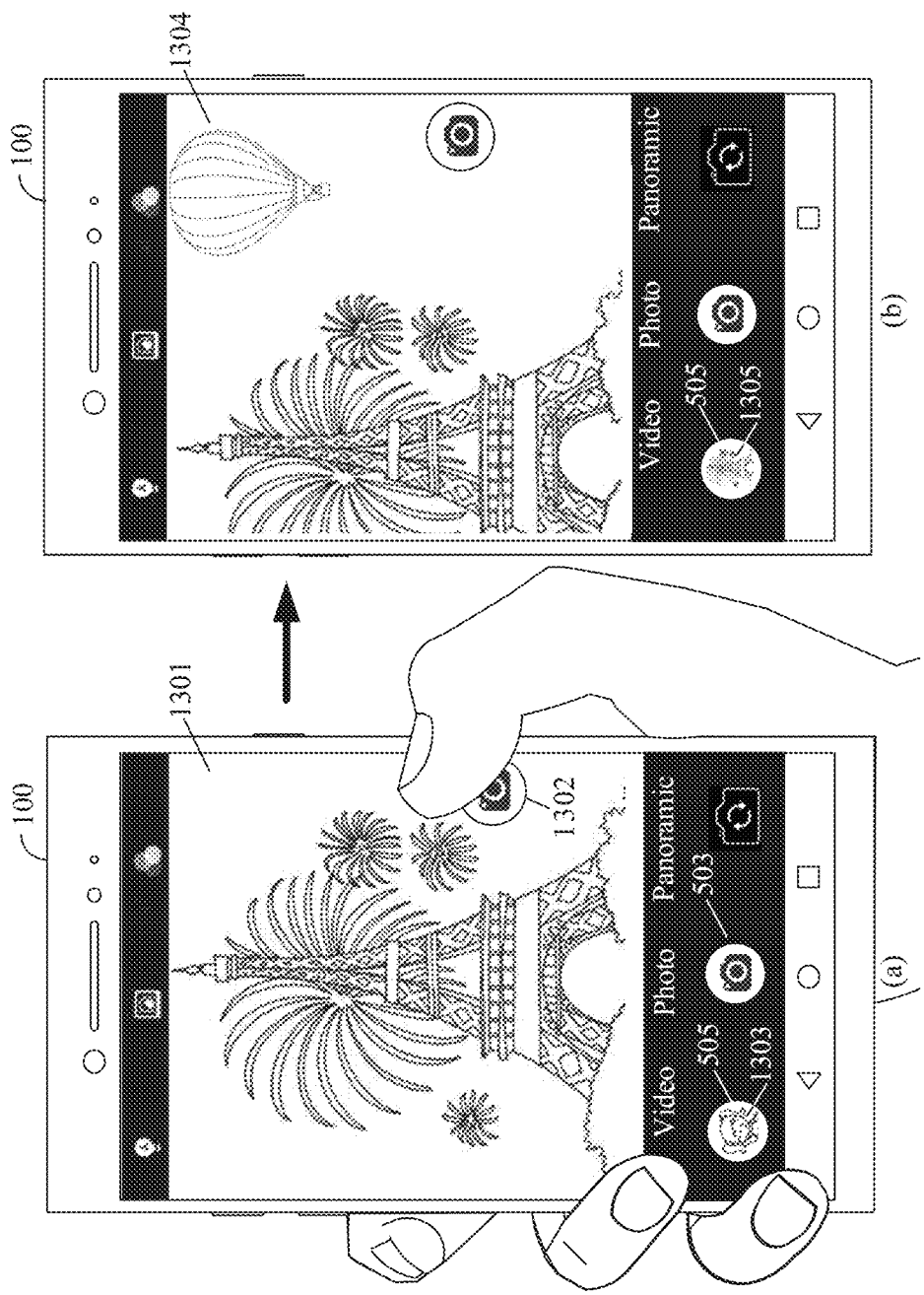
FIG. 13 is a schematic diagram 8 of an example of a mobile phone interface according to this application.

The third operation of the user on the second photographing control may be a tap operation of the user on a second photographing control 1302 on a second interface 1301 shown in (a) in FIG. 13, and is equivalent to a tap operation of the user on the photographing key 503 shown in (a) in FIG. 13.

For example, after the user taps the second photographing control 1302 shown in (a) in FIG. 13, the mobile phone 100 may save, in response to the third operation of the user on the second photographing control 1302, an image captured by the camera in response to the third operation, and display a display interface 1304 shown in (b) in FIG. 13. After the terminal responds to the third operation, a photo displayed on an icon corresponding to the gallery key 505 changes from a "girl" 1303 shown in (a) in FIG. 13 to a photo 1305 shown in (b) in FIG. 13, where the photo 1305 is an image in the viewfinder frame shown in (a) in FIG. 13.

Optionally, to facilitate user operations, when the left hand of the user holds the terminal, the terminal may display the second photographing control in a high-frequency touch area on a left side of the second interface, or when the right hand of the user holds the terminal, the terminal may display the second photographing control in a high-frequency touch area on a right side of the second interface, so that the user can operate the second photographing control more conveniently and comfortably, and user experience can be improved. As shown in (a) in FIG. 13, because the user holds the mobile phone 100 by using the right hand, the mobile phone 100 may display the second photographing control 1302 in the high-frequency touch area on the right side of the second interface to facilitate user operations.

In this application, the terminal may display, on the second interface, the second photographing control used to control the terminal to perform photographing, and the second photographing control may be displayed on one side on which the user holds the terminal, so that the user can operate the second photographing control more conveniently and comfortably. This can avoid a problem that a single hand of the user cannot conveniently tap the photographing shutter of the terminal for photographing when the touchscreen of the terminal is relatively large, and can improve user experience.

Further, different operations of the user on the second photographing control may be used to instruct the terminal to perform different operations. For example, the terminal may save, in response to the third operation of the user on the second photographing control, the image captured by the camera in response to the third operation, and switch between photographing modes of the terminal in response to a fourth operation of the user on the second photographing control. The third operation and the fourth operation are different. For example, the third operation may be a tap operation of the user on the second photographing control, and the fourth operation may be a double-tap operation or a touch and hold operation of the user on the second photographing control.

Figure 14:
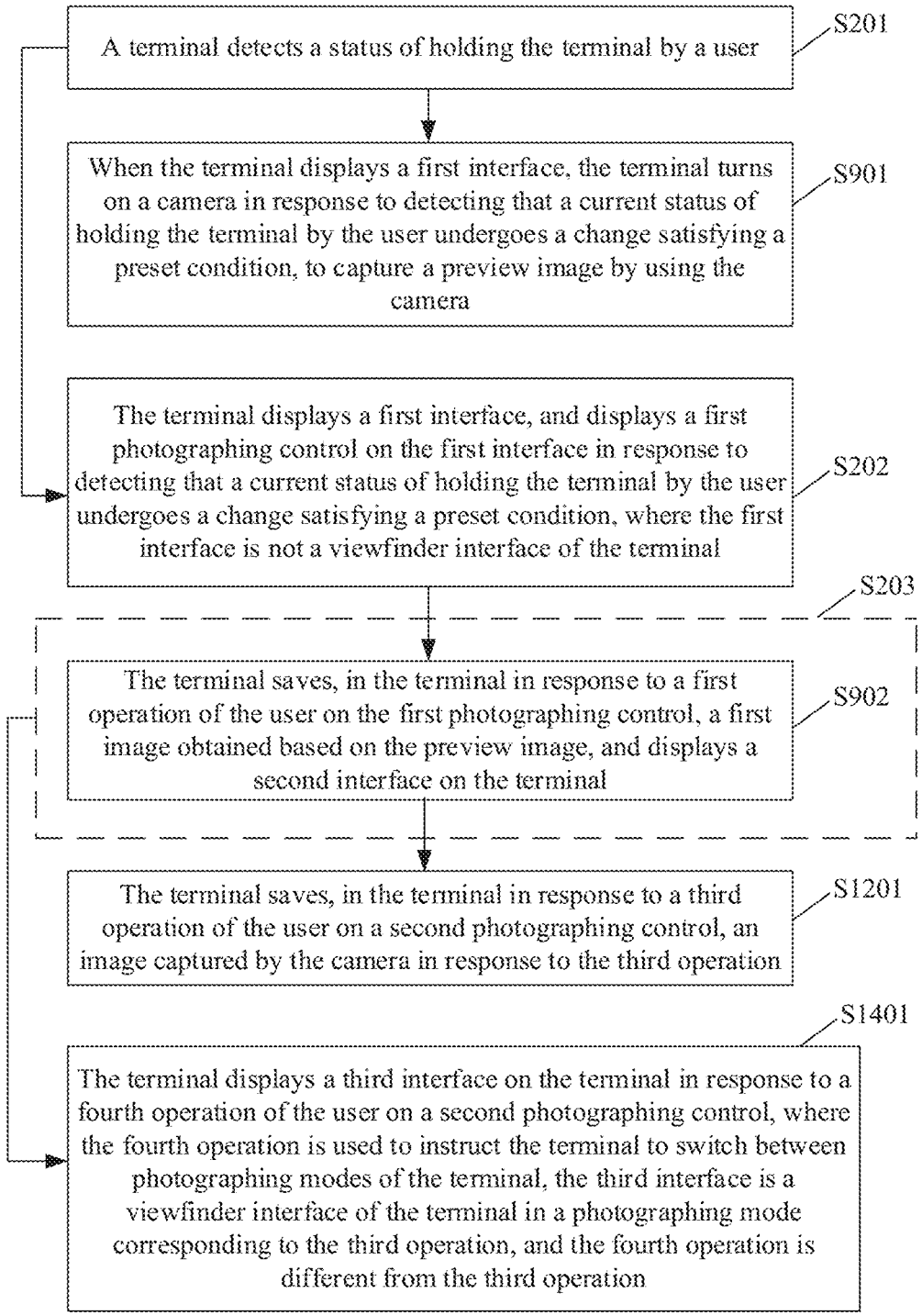
FIG. 14 is a flowchart 5 of a photographing method according to this application.

Specifically, after S203, the method in this application may further include S1401. For example, as shown in FIG. 14, after S902 (that is, S203) shown in FIG. 9, the method in this application may further include S1401.

S1401. The terminal displays a third interface on the terminal in response to the fourth operation of the user on the second photographing control, where the fourth operation is used to instruct the terminal to switch between photographing modes of the terminal, the third interface is a viewfinder interface of the terminal in a photographing mode corresponding to the third operation, and the fourth operation is different from the third operation.

For example, it is assumed that the third operation is a tap operation of the user on the second photographing control, and that the fourth operation is a double-tap operation or a touch and hold operation of the user on the second photographing control.

In a possible implementation, when the fourth operation in this application is a different user operation such as a double-tap operation or a touch and hold operation, the third interface may also be a photographing interface of the terminal in a different photographing mode. To be specific, the third interface is a photographing interface of the terminal in a photographing mode corresponding to the fourth operation. For example, when the fourth operation is a double-tap operation, the third interface is a photographing interface in the panoramic mode; or when the fourth operation is a touch and hold operation, the third interface is a photographing interface in the self-photographing mode.

In another possible implementation, the terminal may switch between the photographing modes of the terminal sequentially in response to the fourth operation of the user on the second photographing control. For example, the terminal may switch between the photographing modes of the terminal sequentially in a sequence of the photographing mode, the panoramic mode, the self-photographing mode, and the video recording mode in response to the fourth operation of the user on the second photographing control. For example, if the terminal is in the photographing mode currently, the terminal may switch the terminal to the panoramic mode in response to the fourth operation of the user on the second photographing control; if the terminal is in the panoramic mode currently, the terminal may switch the terminal to the self-photographing mode in response to the fourth operation of the user on the second photographing control; or if the terminal is in the self-photographing mode currently, the terminal may switch the terminal to the video recording mode in response to the fourth operation of the user on the second photographing control.

Figure 15:
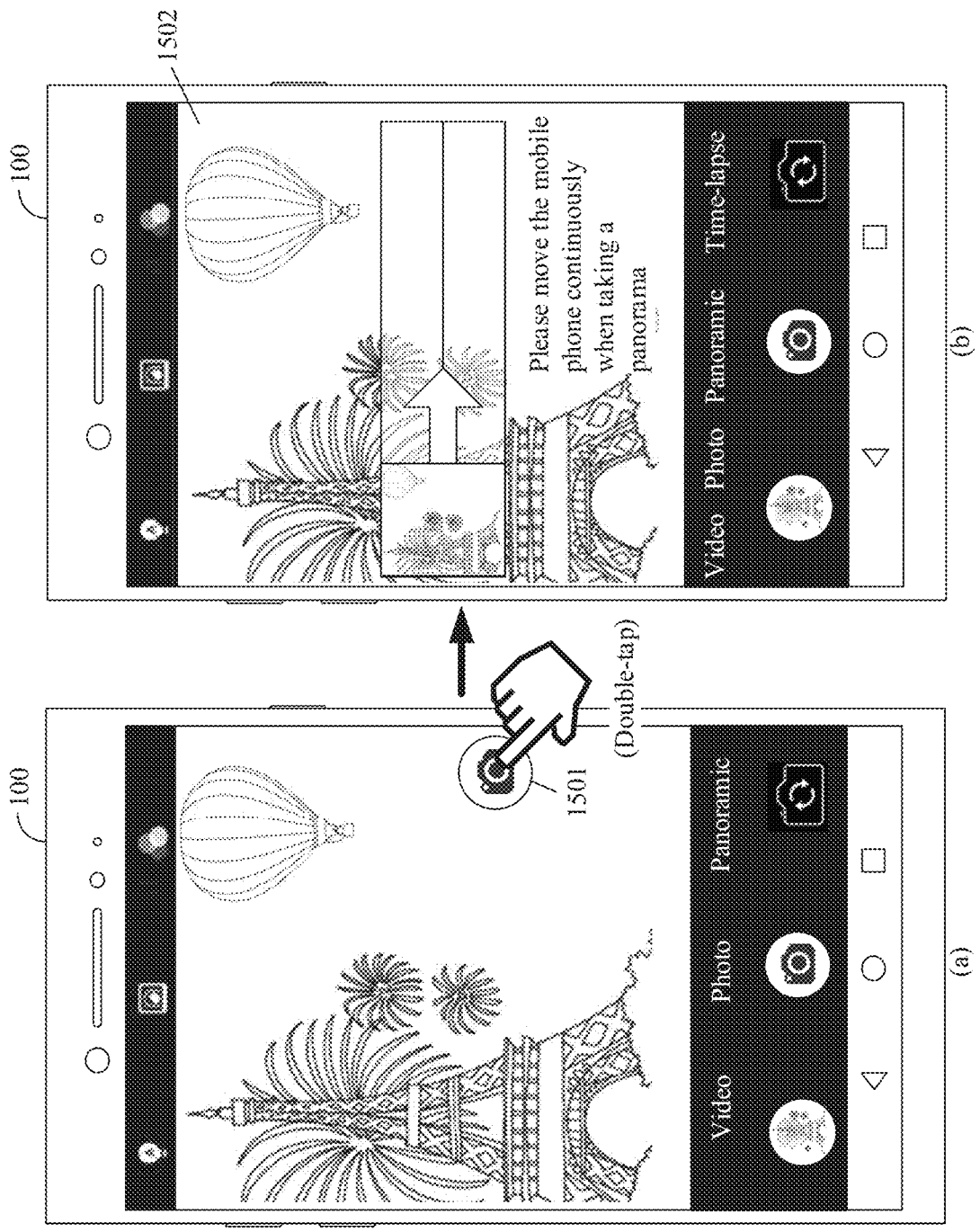
FIG. 15 is a schematic diagram 9 of an example of a mobile phone interface according to this application.

For example, after the user double-taps a second photographing control 1501 shown in (a) in FIG. 15, the mobile phone 100 may display, in response to the double-tap operation (that is, the fourth operation) of the user on the second photographing control 1501, a second interface 1502 shown in (b) in FIG. 15. The second interface 1502 shown in (b) in FIG. 15 is a photographing interface in the panoramic mode.

In this application, the terminal may switch between the photographing modes of the terminal in response to the fourth operation of the user on the second photographing control. This improves efficiency of switching between the photographing modes of the terminal by the user, and improves user experience.

Optionally, in this application, as the gesture of holding the terminal by the user changes, the first photographing control may move on the first interface; and as the gesture of holding the terminal by the user changes, the second photographing control may also move on the second interface.

Figure 16B:
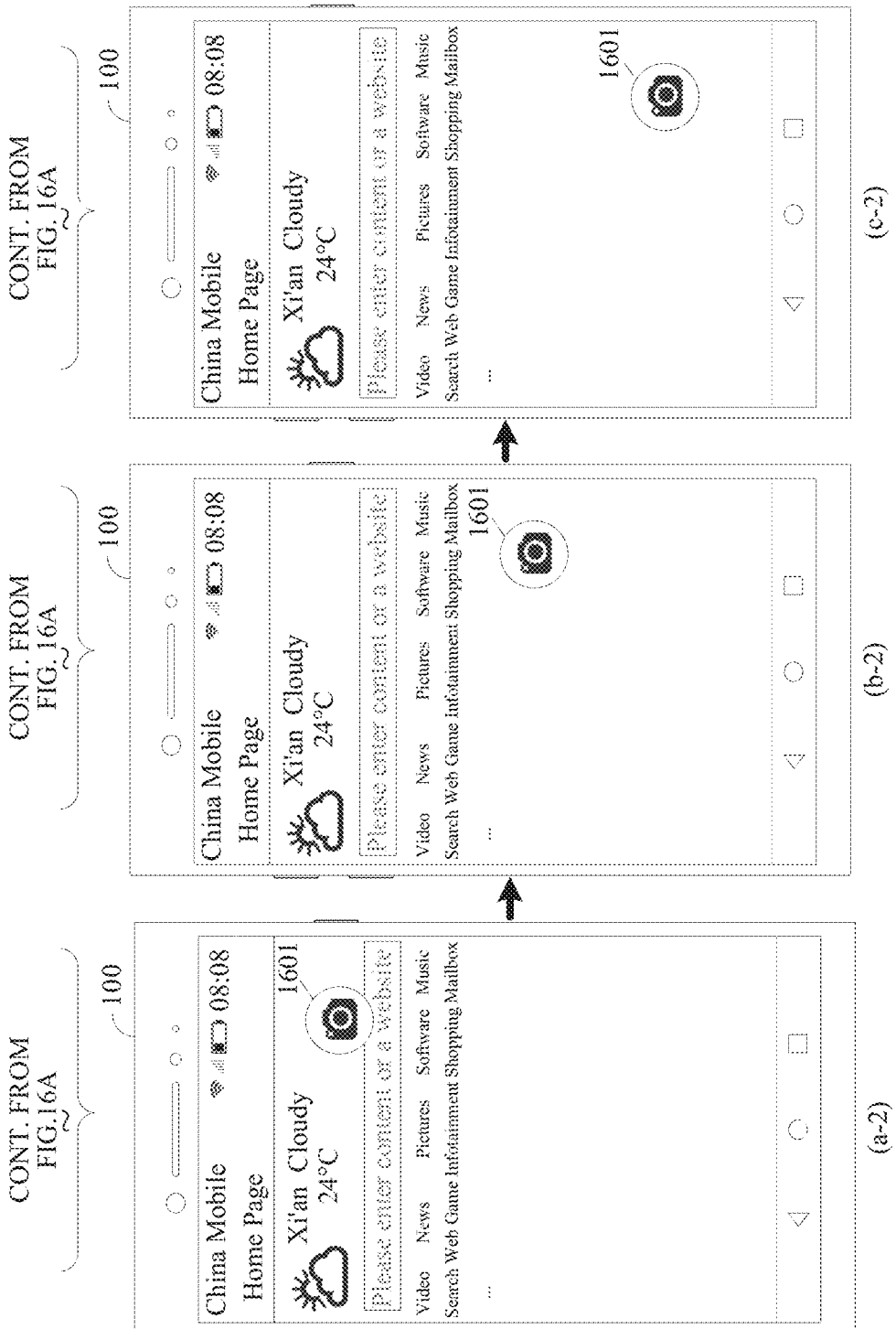
FIG. 16B is another schematic diagram 10 of an example of a mobile phone interface according to this application.

For example, as the gesture of holding the terminal by the user changes, the first photographing control may move on the first interface. As shown in (a-1) in FIG. 16A to (b-1) in FIG. 16A to (c-1) in FIG. 16A, as the user holds and moves the mobile phone 100 upward, as shown in (a-2) in FIG. 16B to (b-2) in FIG. 16B to (c-2) in FIG. 16B, a position of a first photographing control 1601 on the first interface also gradually moves toward a lower bezel of the mobile phone 100 to facilitate user operations.

Optionally, an embodiment of this application further provides a method for photographing in a screen-off state. The method specifically includes the following: A terminal is compatible with an existing operation of lighting a screen, for example, screen lighting implemented by using a physical key or a screen-off gesture such as double-tapping the screen or wake screen on wrist raise. When the terminal detects that a user operation satisfies a preset condition when a camera is in an off state, the terminal displays a camera control on the screen, where the camera control may be displayed on the lit screen, or when an AMOLED or the like may be used to light a part of the screen, the terminal may display only one control of the camera on a screen-off interface, or may display a part, for example, display the camera and other controls such as time or a status bar. In addition, the camera control may be displayed on the current interface in a floating manner. A user may implement operations on the camera control very conveniently by dragging. In addition, a display position of the camera control may change with a current holding status of the user. For example, if the terminal detects that the current status is a right-hand holding state, the terminal displays the camera control in a high-frequency touch area on a right side of the screen of the terminal; or if the terminal detects that the current status is a left-hand holding state, the terminal displays the camera control in a high-frequency touch area on a left side of the screen of the terminal. Detecting the left-hand or right-hand holding state pertains to the prior art, and is not described herein. In response to detecting the operation of the user on the camera control, the terminal displays a viewfinder interface. Specifically, for a specific implementation of the embodiment of the method for photographing in the screen-off state, refer to the method for photographing in the screen-on state. Details are not described again.

Figure 17:
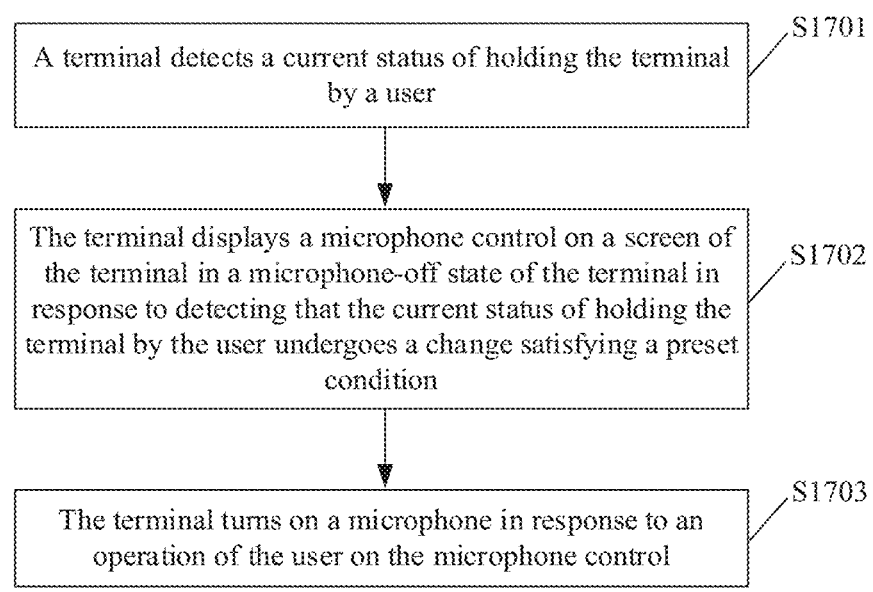
FIG. 17 is a flowchart of a control method according to this application.

This application further provides a control method, the control method may be applied to a terminal including a microphone and a sensor, and the sensor is configured to detect a status of holding the terminal by a user. As shown in FIG. 17, the control method includes S1701 to S1703.

S1701. A terminal detects a current status of holding the terminal by a user.

For detailed descriptions about S1701, refer to the detailed descriptions about S201 in the foregoing embodiment of this application. Details are not described again herein in this embodiment of this application.

S1702. The terminal displays a microphone control on a screen of the terminal in a microphone-off state of the terminal in response to detecting that a current status of holding the terminal by the user undergoes a change satisfying a preset condition.

Figure 18B:
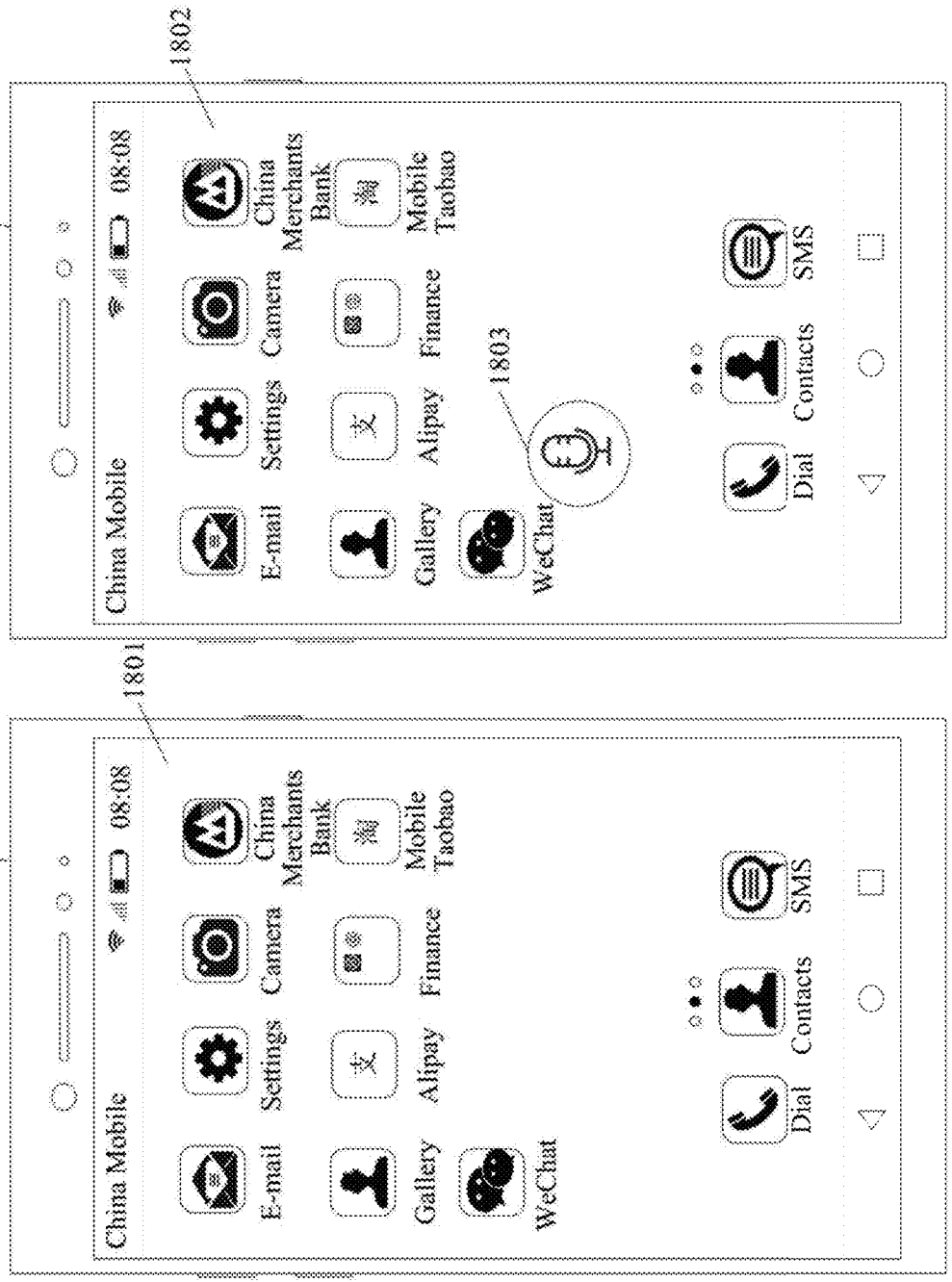
FIG. 18B is another schematic diagram 11 of an example of a mobile phone interface according to this application.

It is assumed that when a mobile phone 100 displays a home screen 1801 including a plurality of application icons shown in (a-2) in FIG. 18B, or when a mobile phone 100 displays a locked-screen interface, or when a mobile phone 100 displays a display interface of any application, the microphone of the terminal is not turned on.

The microphone-off state of the terminal in this embodiment may also be that the terminal is in a screen-off state. To be specific, when the terminal is in the screen-off state, the terminal may display the microphone control on the terminal in response to detecting that the current status of holding the terminal by the user undergoes the change satisfying the preset condition.

It should be noted that, in this embodiment of this application, when the terminal is in the microphone-off state, an interface displayed by the terminal is referred to as a first interface. For the first interface, refer to the detailed descriptions about the first interface in S202. Details are not described again herein in this embodiment of this application. For example, as shown in (b-2) in FIG. 18B, the first interface may be a home screen 1802 including a plurality of application icons. The first interface shown in (b-2) in FIG. 18B includes a microphone control 1803. As shown in (b-2) in FIG. 19, the first interface may be a locked-screen interface 1901. The first interface shown in (b-2) in FIG. 19 includes a microphone control 1902.

Generally, for example, the terminal is a mobile phone 100 shown in FIG. 18. When the user uses the mobile phone 100 for voice input, as shown in (a-1) in FIG. 18A, the user may pick up the mobile phone 100; and then as shown in (a-1) in FIG. 18A to (b-1) in FIG. 18A, the user may gradually raise an arm until a lower end of the mobile phone 100 shown in (b-1) in FIG. 18A is close to a face of the user. In this case, the user may start to record voice data. For example, in this embodiment, "a current status of holding the terminal by the user undergoes a change satisfying a preset condition" may specifically include: a downtilt of a top of the mobile phone reaches a degree or an included angle between a horizontal direction of the mobile phone and a horizontal line reaches a preset angle after the sensor detects that the terminal is rotated and moves upward (detecting that the microphone of the terminal is close to the face (specifically a lip)).

For example, when the mobile phone 100 displays the first interface (an interface displayed by the mobile phone 100 when the mobile phone 100 is in the microphone-off state) shown in (a-2) in FIG. 18B, and the status of holding the mobile phone 100 by the user undergoes a change (that is, the change satisfying the preset condition) shown in (a-1) in FIG. 18A to (b-1) in FIG. 18A, the mobile phone 100 may display the first interface 1802 including the microphone control 1803. When the mobile phone 100 is in the screen-off state shown in (a-2) in FIG. 19, and the status of holding the mobile phone 100 by the user undergoes a change (that is, the change satisfying the preset condition) shown in (a-1) in FIG. 19 to (b-1) in FIG. 19, the mobile phone 100 may display the first interface 1901 including the microphone control 1902.

It should be noted that, the change satisfying the preset condition in this embodiment of this application includes but is not limited to the change shown in (a-1) in FIG. 18A to (b-1) in FIG. 18A. Because different users have different habits of recording voice data, the terminal may collect statistics about status change parameters captured by the sensor in voice data recording processes of most or all users using the terminal, and determine changes of the status change parameters as changes satisfying the preset condition. Therefore, when a change of parameters matching the status change parameters captured by the sensor in the terminal is a change satisfying the preset condition, the terminal may determine that a possibility of using the terminal by the user to record voice data is relatively high, and may automatically display the first interface including the microphone control. In addition, a system or the user may set that the foregoing action should be repeated for several times and then entering a speech recognition state is triggered. It should be noted that, the microphone control in this application may be displayed in a fixed position on the first interface; or the microphone control may be displayed on the first interface in a floating manner, and the terminal may display, on the first interface in response to a moving operation of the user on the microphone control, dynamic images of the microphone control that dynamically moves along a moving track of the moving operation.

Optionally, to facilitate user operations, the terminal may further identify whether the terminal is currently held by a left hand of the user or held by a right hand of the user, and then automatically display the microphone control in an area that facilitates the user operations. Specifically, S1702 may include S1702a.

S1702a. The terminal displays the microphone control on a left side of the first interface in the microphone-off state of the terminal in response to detecting that the current status of holding the terminal by the user undergoes the change satisfying the preset condition, or displays the microphone control on a right side of the first interface if the terminal is held by a right hand of the user.

Optionally, if the terminal is held by the left hand of the user, the terminal may display the microphone control in a high-frequency touch area on the left side of the first interface; or if the terminal is held by the right hand of the user, the terminal may display the microphone control in a high-frequency touch area on the right side of the first interface. The high-frequency touch area is a touch area in which a frequency or quantity of user operations is higher than a preset threshold on the interface of the terminal.

Figure 19:
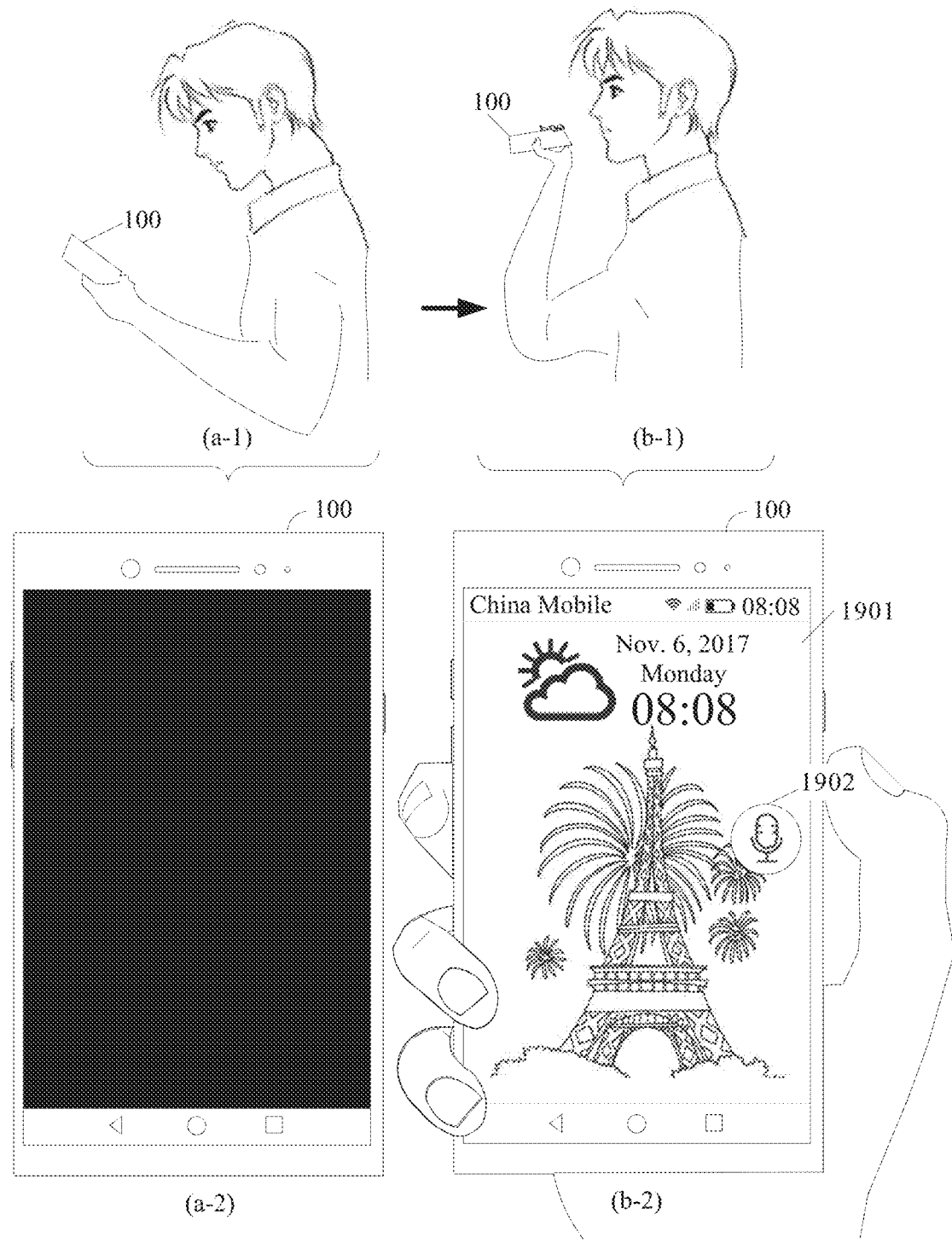
FIG. 19 is a schematic diagram 12 of an example of a mobile phone interface according to this application.

For example, as shown in FIG. 19, when the right hand of the user holds the mobile phone 100, the mobile phone 100 may display the microphone control 1902 in a high-frequency touch area on a right side of the first interface 1901 to facilitate user operations.

S1703. The terminal turns on the microphone in response to an operation of the user on the microphone control.

Specifically, S1703 may include: the terminal turns on the microphone in response to the operation of the user on the microphone control, and enables a speech recognition function.

In addition, the system or the user may set a gesture amplitude, or a feedback such as a haptic feedback, a visual feedback, or an auditory feedback to trigger entering the speech recognition state. To be specific, a prompt such as a visual prompt, an auditory prompt, or a haptic prompt is provided for the user when the microphone is turned on.

In this embodiment of this application, the terminal may display the microphone control in the high-frequency touch area on the left side of the first interface when the terminal is held by the left hand of the user, or display the microphone control in the high-frequency touch area on the right side of the first interface when the terminal is held by the right hand of the user, so that the user can operate the microphone more conveniently and comfortably, and user experience can be improved.

Figure 20:
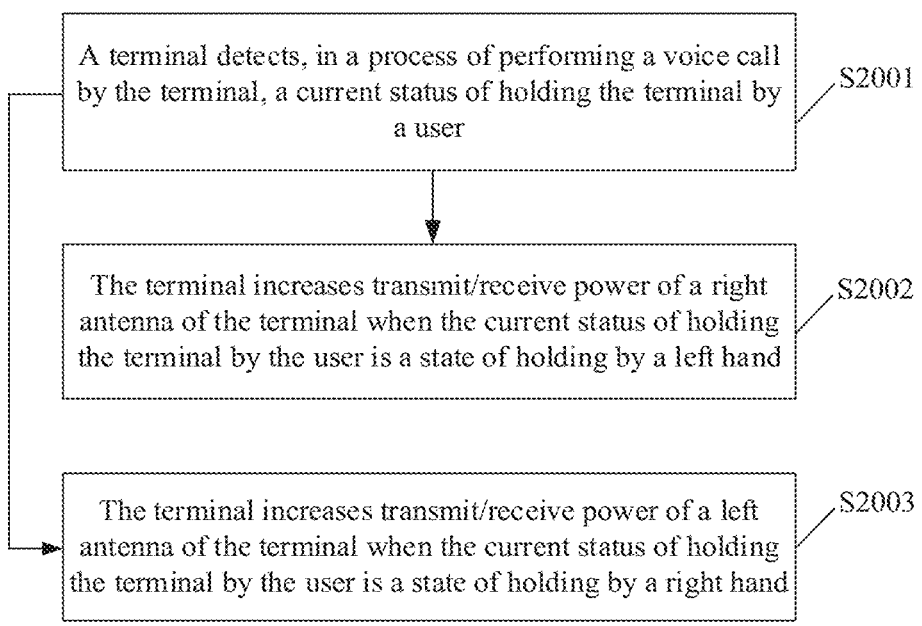
FIG. 20 is a flowchart 1 of a communication method according to this application.

This application further provides a communication method, and the communication method is applied to a terminal including a left antenna and a right antenna. The left antenna is disposed on a left part of the terminal, and the right antenna is disposed on a right part of the terminal. As shown in FIG. 20, the communication method includes S2001 to S2003.

S2001. A terminal detects, in a voice communication process of the terminal, a current status of holding the terminal by a user.

The current status of holding the terminal by the user includes a state of the terminal being held by a left hand or a state of the terminal being held by a right hand. For the method for determining, by the terminal, whether the terminal is held by the left hand of the user or held by the right hand of the user, refer to related descriptions of the foregoing embodiment of this application. Details are not described again herein in this application.

S2002. The terminal increases transmit/receive power of the right antenna of the terminal when the current status of holding the terminal by the user is the state of holding by the left hand.

S2003. The terminal increases transmit/receive power of the left antenna of the terminal when the current status of holding the terminal by the user is the state of holding by the right hand.

Figure 21:
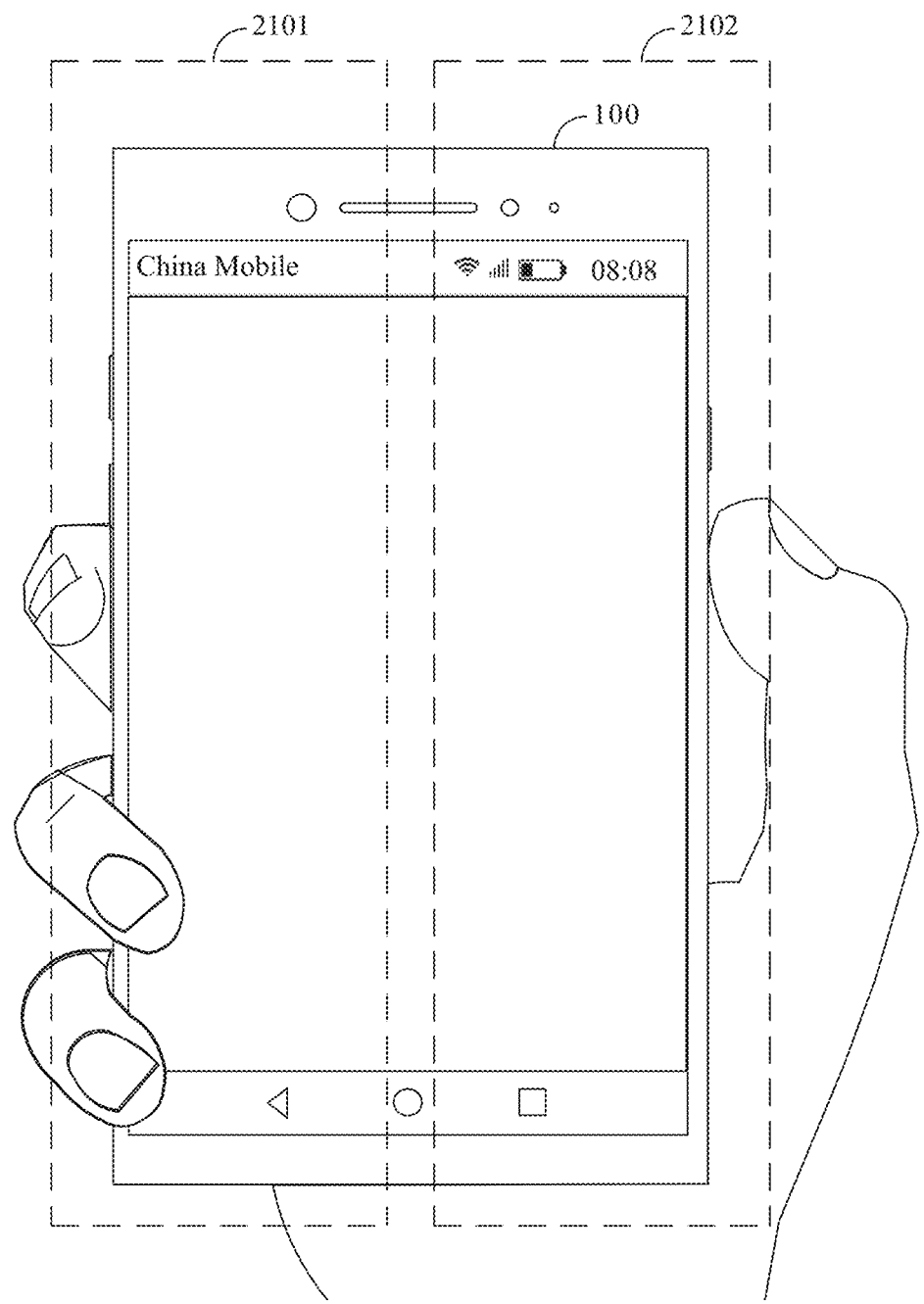
FIG. 21 is a schematic diagram of a division example of a left side and a right side of a mobile phone according to this application.

In this application, the left side of the terminal is a side corresponding to the left hand of the user when a screen of the terminal is opposite to the user, and the right side of the terminal is a side corresponding to the right hand of the user when the screen of the terminal is opposite to the user. For example, as shown in FIG. 21, the terminal is a mobile phone 100. A left side of the mobile phone 100 may be a part corresponding to a dashed-line block 2101, and a right side of the mobile phone 100 may be a part corresponding to a dashed-line block 2102.

In this application, the left antenna of the terminal is an antenna disposed on the left side of the terminal, and the right antenna is an antenna disposed on the right side of the terminal. For example, as shown in FIG. 21, a left antenna of the mobile phone 100 may be disposed in the part corresponding to the dashed-line block 2101 in the mobile phone 100, and a right antenna of the mobile phone 100 may be disposed in the part corresponding to the dashed-line block 2102 in the mobile phone 100.

It may be conceived that the mobile phone 100 is used as an example of the terminal. In a voice communication process of the mobile phone 100, if the right hand of the user holds the mobile phone 100 in FIG. 21, the right side (the part corresponding to the dashed-line block 2102) of the mobile phone 100 is closer to an ear of the user than the left side (the part corresponding to the dashed-line block 2101) of the mobile phone 100. In this case, because the right side of the mobile phone 100 is close to the ear of the user, the right antenna of the mobile phone 100 may suffer relatively great interference. In this case, using the method in this application to increase transmit/receive power of the left antenna of the mobile phone 100 may ensure that voice communication quality of the mobile phone 100 is not affected.

Likewise, in a voice communication process of the mobile phone 100, if the left hand of the user holds the mobile phone 100, the left side (the part corresponding to the dashed-line block 2101) of the mobile phone 100 is closer to an ear of the user than the right side (the part corresponding to the dashed-line block 2102) of the mobile phone 100. In this case, because the left side of the mobile phone 100 is close to the ear of the user, the left antenna of the mobile phone 100 may suffer relatively great interference. In this case, using the method in this application to increase transmit/receive power of the right antenna of the mobile phone 100 may ensure that voice communication quality of the mobile phone 100 is not affected.

In the communication method provided in this embodiment of this application, in the voice communication process of the terminal, the terminal may determine the status of holding the terminal by the user; and when the status of holding the terminal by the user is the state of holding by the left hand, considering that the left antenna may suffer relatively great interference, to ensure that voice communication quality of the terminal is not affected, the transmit/receive power of the right antenna may be increased; or when the current status of holding the terminal by the user is the state of holding by the right hand, considering that the right antenna may suffer relatively great interference, to ensure that voice communication quality of the terminal is not affected, the transmit/receive power of the left antenna may be increased.

Figure 22:
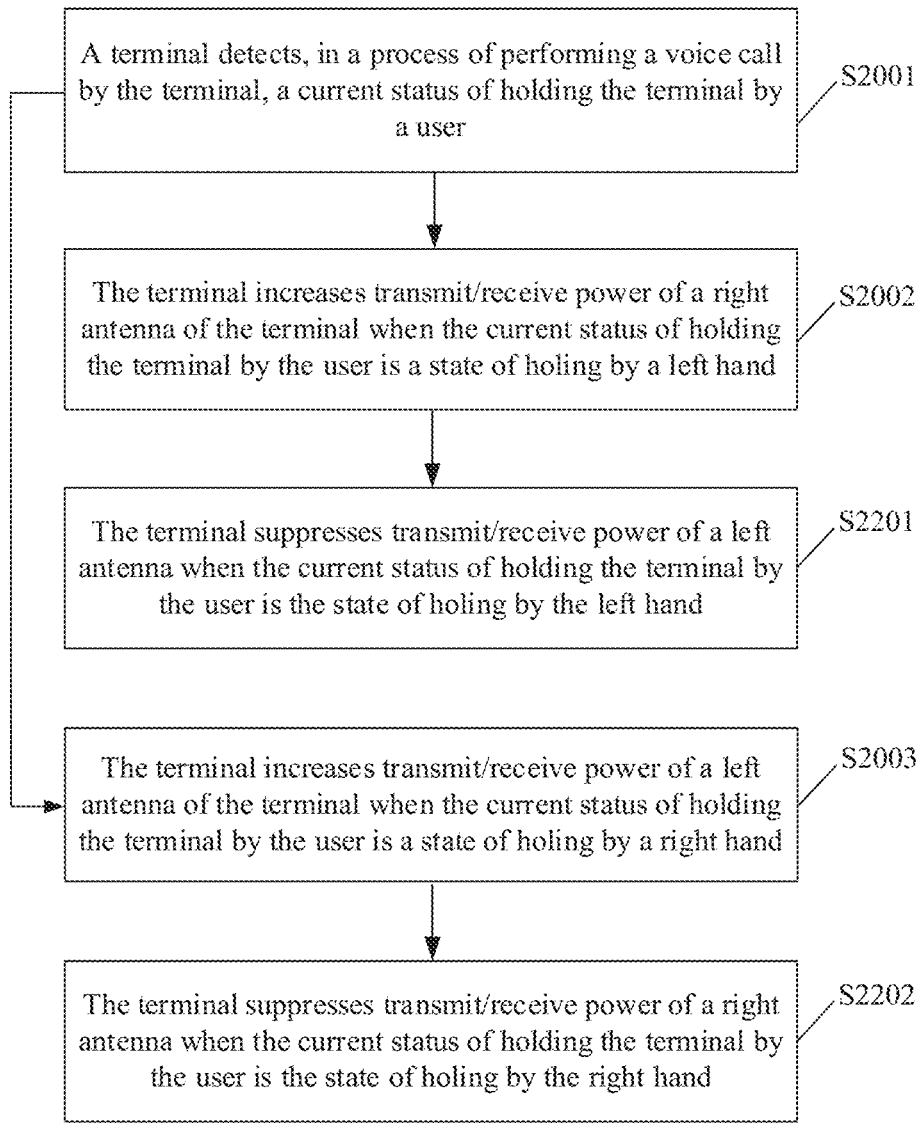
FIG. 22 is a flowchart 2 of a communication method according to this application.

Further, when the status of holding the terminal by the user is the state of holding by the left hand, the left antenna may suffer relatively great interference; or when the status of holding the terminal by the user is the state of holding by the right hand, the right antenna may suffer relatively great interference. Therefore, if one antenna of the terminal suffers relatively great interference, to reduce power consumption of the terminal, the terminal may suppress transmit/receive power of the antenna. Specifically, as shown in FIG. 22, after S2001 shown in FIG. 20, the method in this application may further include S2201 and S2202.

S2201. The terminal suppresses transmit/receive power of the left antenna when the current status of holding the terminal by the user is the state of holding by the left hand.

When the current status of holding the terminal by the user is the state of holding by the left hand, the left antenna may suffer relatively great interference. To reduce power consumption of the terminal, the terminal may suppress the transmit/receive power of the left antenna.

S2202. The terminal suppresses transmit/receive power of the right antenna when the current status of holding the terminal by the user is the state of holding by the right hand.

When the current status of holding the terminal by the user is the state of holding by the right hand, the right antenna may suffer relatively great interference. To reduce power consumption of the terminal, the terminal may suppress the transmit/receive power of the right antenna.

In this application, the terminal may increase transmit/receive power of one antenna that suffers less interference, and suppress transmit/receive power of the other antenna that suffers more interference. Therefore, power consumption of the terminal can be reduced while it is ensured that voice communication quality of the terminal is not affected.

Further, to improve efficiency of performing voice communication by the user by using the terminal, the terminal may adjust volume of a left voice channel and volume of a right voice channel of the terminal based on the status of holding the terminal by the user. Specifically, after S2001, the method in this application may further include S2203 and S2204.

S2203. When the current status of holding the terminal by the user is the state of holding the mobile phone by the left hand, the terminal turns up the volume of the left voice channel of the terminal.

If the current status of holding the terminal by the user is the state of holding the mobile phone by the left hand, it indicates that the left side of the terminal is closer to the ear of the user. To enable the user to more clearly hear voice information transmitted from a peer device in the voice communication, the terminal may turn up the volume of the left voice channel of the terminal.

S2204. When the current status of holding the terminal by the user is the state of holding the mobile phone by the right hand, the terminal turns up the volume of the right voice channel of the terminal.

If the current status of holding the terminal by the user is the state of holding the mobile phone by the right hand, it indicates that the right side of the terminal is closer to the ear of the user. To enable the user to more clearly hear the voice information transmitted from the peer device in the voice communication, the terminal may turn up the volume of the right voice channel of the terminal.

Further, when the current status of holding the terminal by the user is the state of holding the mobile phone by the left hand, the terminal may turn down the volume of the right voice channel of the terminal; or when the current status of holding the terminal by the user is the state of holding the mobile phone by the right hand, the terminal may turn down the volume of the left voice channel of the terminal. Therefore, adverse impact of the voice information transmitted from the peer device on other users in the voice communication process of the terminal can be reduced, and a possibility of hearing content of the voice communication by the other users can be further reduced. This helps protect privacy of the user.

In this application, the terminal may further adjust the volume of the left voice channel and the volume of the right voice channel of the terminal based on the status of holding the terminal by the user, so that the user can more clearly hear the voice information transmitted by the peer device in the voice communication. Therefore, an effect of the voice communication can be enhanced. In addition, the possibility of hearing the content of the voice communication by the other users can be further reduced. This helps protect privacy of the user.

This application further provides a display method, and the display method may be applied to a terminal including one or more sensors. The one or more sensors are configured to detect a motion status of the terminal. The display method includes: a terminal detects a motion parameter of the terminal by using a sensor, and displays an interface of a fitness application when the detected motion parameter indicates that the terminal is in a fitness state of a user. The motion parameter includes at least a parameter captured by the sensor when the user does exercises, such as a parameter captured by the sensor when the user runs, a parameter captured by the sensor when four limbs of the user move or when the user twists the waist, or a parameter captured by the sensor when the user bounces.

It may be understood that, no matter which interface the terminal currently displays, such as the interface 303 of the "Browser" application shown in (a-2) in FIG. 4B, the home screen 1801 including a plurality of application icons as shown in (a-2) in FIG. 18B, the screen-off state shown in FIG. 19, or the locked-screen interface 301 shown in FIG. 3A, when the sensor captures the foregoing motion parameter, the terminal may display the interface of the fitness application, so that the user can operate the terminal on the interface of the fitness application, and the terminal records motion data of the user in the fitness application. Certainly, when the terminal captures the foregoing motion parameter, the terminal may not display the interface of the fitness application, but directly records the motion data of the user in the fitness application.

Figure 23:
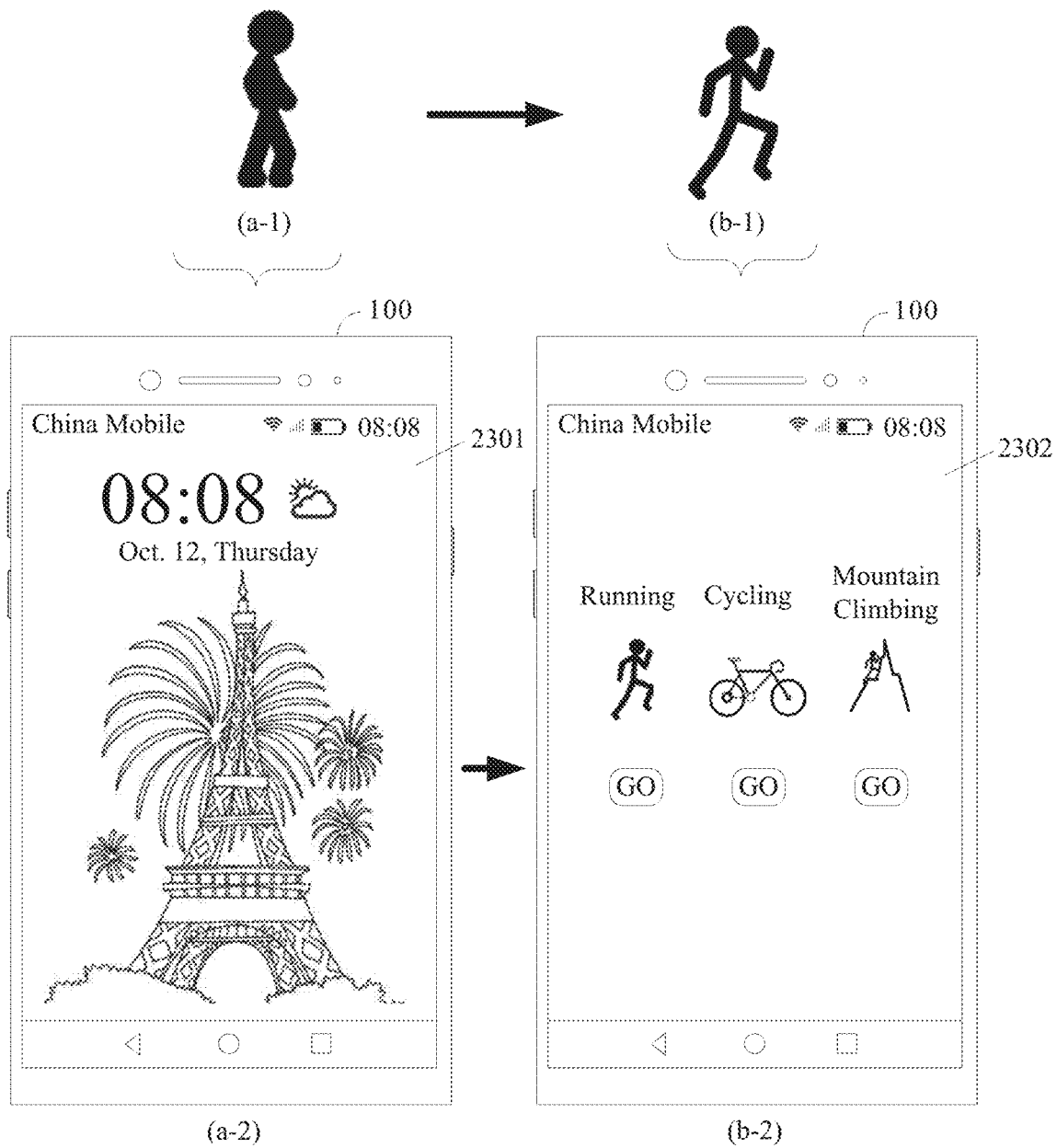
FIG. 23 is a schematic diagram 13 of an example of a mobile phone interface according to this application.

For example, it is assumed that when the user walks or stands still as shown in (a-1) in FIG. 23, a mobile phone 100 displays a locked-screen interface 2301 shown in (a-2) in FIG. 23. When the user starts to run as shown in (b-1) in FIG. 23, a sensor in the mobile phone 100 may capture the motion parameter when the user runs. In this case, the mobile phone 100 may search for all applications that are installed in the mobile phone 100 and whose application attributes are sport or fitness or health, and present a search result to the user, for example, display an interface 2302 of the fitness application shown in (b-2) in FIG. 23. Optionally, the interface 2302 of the fitness application includes a plurality of sports items, such as "running", "cycling", and "mountain climbing". The user may select, from the plurality of sports items, a sports item corresponding to a current sport of the user, so that the terminal can record corresponding motion data in the fitness application. Optionally, the terminal may also first search for applications that are already enabled or applications that are in running states and whose attributes are sport-related, for example, sport/fitness/shaping/health, and present found applications; or after no started sport-related application is found, may search for sport-related applications installed in the terminal; or may search for all sport-related applications installed in the terminal, and arrange a started application in a first position.

In the display method provided in this application, the terminal may detect the motion parameter of the terminal by using the sensor, and may display the interface of the fitness application when the detected motion parameter indicates that the terminal is in the fitness state of the user. The interface of the fitness application can be opened without requiring excessive user operations. In this application, after detecting the motion parameter of the terminal, the terminal may automatically search for all applications that are already installed in the terminal and whose attributes are fitness or sport, and display the applications on a screen, that is, display the interface of the fitness application. Therefore, the user can operate the terminal on the interface of the fitness application, so that the terminal records the motion data of the user in the fitness application. This improves man-machine interaction performance, improves operation efficiency, and further improves user experience.

It may be understood that, to implement the foregoing functions, the terminal includes corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, functional modules in the terminal or the like may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that, in the embodiments of the present invention, module division is an example, and is merely logical function division. In actual implementation, another division manner may be used.

Figure 24:
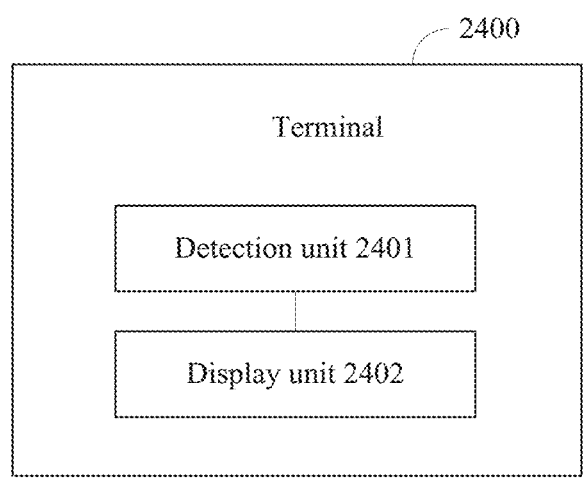
FIG. 24 is a schematic structural diagram 1 of a terminal according to this application.

When each functional module is defined in a correspondence to each function, as shown in FIG. 24, an embodiment of this application provides a terminal 2400. The terminal 2400 includes a detection unit 2401 and a display unit 2402.

The detection unit 2401 is configured to support the terminal in performing S201 in the foregoing method embodiment, and/or is used in other processes of the technology described in this specification. The display unit 2402 is configured to support the terminal in performing S202, S203, S601, S202a, and S1401 in the foregoing method embodiments, and/or is used in other processes of the technology described in this specification.

Further, the terminal 2400 may further include a turn-on unit. The turn-on unit is configured to support the terminal in performing S901 in the foregoing method embodiment, and/or is used in other processes of the technology described in this specification.

Further, the terminal 2400 may further include a storage unit. The storage unit is configured to support the terminal in performing S902 and S1201 in the foregoing method embodiments, and/or is used in other processes of the technology described in this specification.

Certainly, the terminal 2400 includes but is not limited to the units and modules illustrated above. For example, the terminal 2400 may further include a communications unit, and the communications unit is configured to communicate with another terminal. In addition, functions that the functional units can specifically implement include but are not limited to the functions corresponding to the method steps in the foregoing examples. For detailed descriptions about other units of the terminal 2400, refer to the detailed descriptions about the method steps corresponding to the units. Details are not described again herein in this embodiment of this application.

When an integrated unit is used, the detection unit 2401, the turn-on unit, and the like may be integrated in a processing module for implementation; the communications unit may be an RF circuit, a Wi-Fi module, or a Bluetooth module of the terminal; the storage unit may be a storage module of the terminal; and the display unit 2402 may be a display module, for example, a touchscreen.

Figure 25:
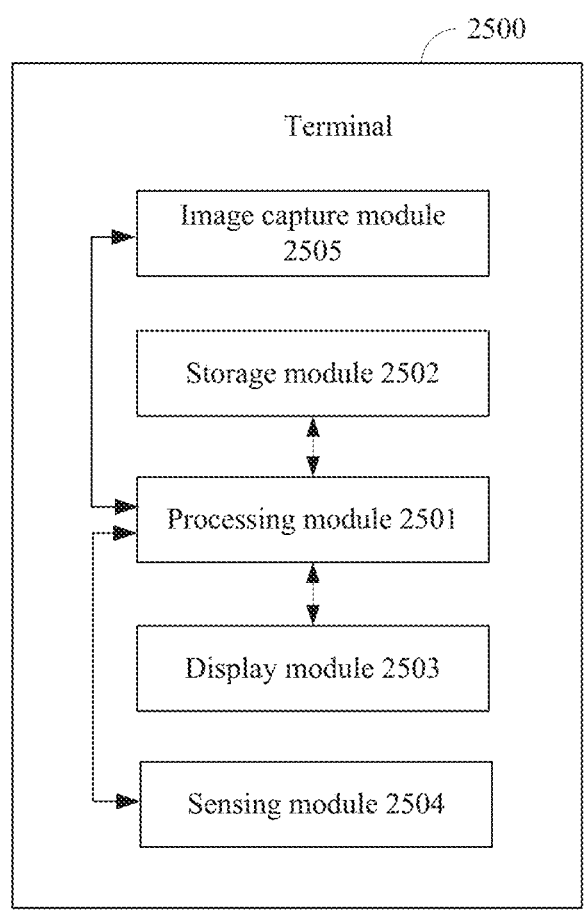
FIG. 25 is a schematic structural diagram 2 of a terminal according to this application.

FIG. 25 is a possible schematic structural diagram of a terminal in the foregoing embodiment. The terminal 2500 includes a processing module 2501, a storage module 2502, a display module 2503, a sensing module 2504, and an image capture module 2505. The sensing module 2504 is configured to detect a status of holding the terminal by a user. The processing module 2501 is configured to control and manage the terminal based on information detected by the sensing module 2504. The display module 2503 is configured to display an image generated by the processing module 2501. The storage module 2502 is configured to store program code and data of the terminal. The image capture module 2505 is configured to capture an image.

Further, the terminal 2500 may further include a communications module. The communications module is configured to communicate with another terminal. For example, the communications module is configured to perform voice communication with another terminal, and receive a profile picture from or send a profile picture to the another terminal.

The processing module 2501 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module may be a transceiver, a transceiver circuit, a communications interface, or the like. The storage module 2502 may be a memory. The sensing module 2504 may be a sensor. The image capture module 2505 may be a camera.

When the processing module 2501 is a processor (such as the processor 501 shown in FIG. 5), and the communications module is an RF circuit (such as the radio frequency circuit 502 shown in FIG. 5), and the storage module 2502 is a memory (such as the memory 103 shown in FIG. 1), and the display module 2503 is a touchscreen (including the touchpad 104-1 and the display 104-2 shown in FIG. 1), and the sensing module 2504 is a sensor (such as the sensor 106 shown in FIG. 1), the terminal provided in this application may be the mobile phone 100 shown in FIG. 1. The communications modules may include not only the RF circuit, but also the Wi-Fi module and the Bluetooth module. The communications modules such as the RF circuit, the Wi-Fi module, and the Bluetooth module may be collectively referred to as a communications interface. The processor, the communications interface, the touchscreen, and the memory may be coupled together by using a bus.

Figure 26:
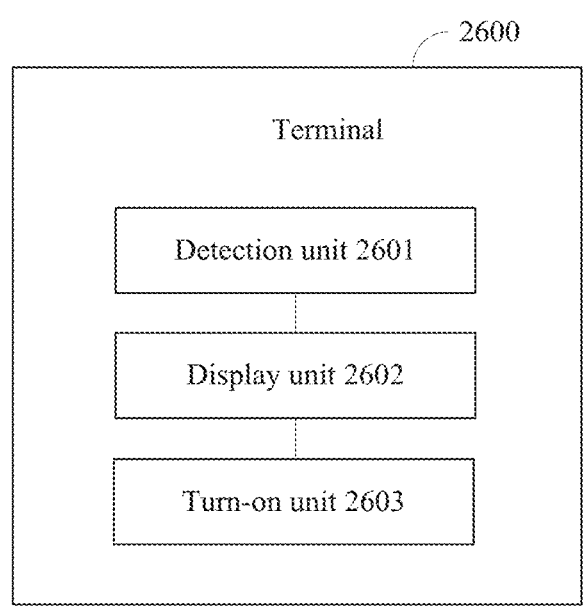
FIG. 26 is a schematic structural diagram 3 of a terminal according to this application.

When each functional module is defined in a correspondence to each function, as shown in FIG. 26, an embodiment of this application provides a terminal. The terminal 2600 includes a microphone and a sensor. The terminal 2600 further includes a detection unit 2601, a display unit 2602, and a turn-on unit 2603.

The detection unit 2601 is configured to support the terminal in performing S1701 in the foregoing method embodiment, and/or is used in other processes of the technology described in this specification. The display unit 2602 is configured to support the terminal in performing S1702 and S1702a in the foregoing method embodiment, and/or is used in other processes of the technology described in this specification. The turn-on unit 2603 is configured to support the terminal in performing S1703 in the foregoing method embodiment, and/or is used in other processes of the technology described in this specification.

Certainly, the terminal 2600 includes but is not limited to the units and modules illustrated above. For example, the terminal 2600 may further include a communications unit, and the communications unit is configured to communicate with another terminal. In addition, functions that the functional units can specifically implement include but are not limited to the functions corresponding to the method steps in the foregoing examples. For detailed descriptions about other units of the terminal 2600, refer to the detailed descriptions about the method steps corresponding to the units. Details are not described again herein in this embodiment of this application.

When an integrated unit is used, the detection unit 2601, the turn-on unit 2603, and the like may be integrated in a processing module for implementation; the communications unit may be an RF circuit, a Wi-Fi module, or a Bluetooth module of the terminal; the storage unit may be a storage module of the terminal; and the display unit 2602 may be a display module, for example, a touchscreen. FIG. 25 is a possible schematic structural diagram of a terminal in the foregoing embodiment. The terminal 2500 shown in FIG. 25 is not described in detail again herein in this embodiment of this application. It should be noted that, the terminal in this embodiment further includes a voice data capture module, and the voice data capture module may be the microphone in FIG. 1.

When each functional module is defined in a correspondence to each function, an embodiment of this application provides a terminal. The terminal includes a left antenna and a right antenna, the left antenna is disposed on a left part of the terminal, and the right antenna is disposed on a right part of the terminal. The terminal further includes a communications unit and a processing unit.

The communications unit is configured to support the terminal in performing voice communication, and/or is used in other processes of the technology described in this specification. The processing unit is configured to support the terminal in performing S2001 to S2003, S2201 and S2202, and S2203 and S2204 in the foregoing method embodiments, and/or is used in other processes of the technology described in this specification.

Certainly, the terminal includes but is not limited to the units and modules illustrated above. For example, the terminal may further include a display unit, and the display unit is configured to display an image generated by the processing unit. In addition, functions that the functional units can specifically implement include but are not limited to the functions corresponding to the method steps in the foregoing examples. For detailed descriptions about other units of the terminal, refer to the detailed descriptions about the method steps corresponding to the units. Details are not described again herein in this embodiment of this application.

When an integrated unit is used, the processing unit may be integrated in a processing module for implementation; the communications unit may be an RF circuit, a Wi-Fi module, or a Bluetooth module of the terminal; the storage unit may be a storage module of the terminal; and the display unit may be a display module, for example, a display (also referred to as a touchscreen in this application). FIG. 25 is a possible schematic structural diagram of a terminal in the foregoing embodiment. The terminal 2500 shown in FIG. 25 is not described in detail again herein in this embodiment of this application.

An embodiment of this application further provides a computer storage medium, and the computer storage medium stores computer program code. When the foregoing processor executes the computer program code, the terminal performs related method steps in any one of FIG. 2, FIG. 6, FIG. 9, FIG. 12, FIG. 14, FIG. 17, FIG. 20, and FIG. 22, to implement the methods in the foregoing embodiments.

An embodiment of this application further provides a computer program product, and when the computer program product is run on a computer, the computer is enabled to perform related method steps in any one of FIG. 2, FIG. 6, FIG. 9, FIG. 12, FIG. 14, FIG. 17, FIG. 20, and FIG. 22, to implement the methods in the foregoing embodiments.

The terminal 2400, the terminal 2500, the terminal 2600, the computer storage medium, and the computer program product provided in this application are all configured to perform the corresponding methods provided above. Therefore, for beneficial effects that the terminals, the computer storage medium, and the computer program product can achieve, refer to beneficial effects in the corresponding methods provided above. Details are not described again herein.

The foregoing descriptions about implementations allow a person skilled in the art to clearly understand that, for the purpose of convenient and brief description, division of the foregoing functional modules is used only as an example for illustration. In actual application, the foregoing functions can be allocated to different modules and implemented based on a requirement, that is, an internal structure of an apparatus is divided into different functional modules to implement all or some of the functions described above. For a detailed working process of the foregoing system, apparatus, and unit, refer to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a computer software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal, comprising:
a display screen;
a camera;
a memory configured to store instructions;
one or more sensors configured to detect a status of holding the terminal by a user; and
one or more processors coupled to the display screen, the camera, the memory, and the one or more sensors, and configured to execute the instructions to cause the terminal to:
display, using the display screen, a first interface, wherein the first interface does not comprise a first photographing control or a viewfinder interface of the terminal;
in response to detecting that an orientation and a position of the terminal have undergone a change satisfying a preset condition and without detecting a touch operation from the user on the display screen:
display, using the display screen, a second interface with the first photographing control, wherein the second interface is not the viewfinder interface of the terminal, and wherein the first photographing control is displayed in a first area of the display screen;
turn on the camera while continuing to display the second interface and not displaying the viewfinder interface;
capture a preview image using the camera while continuing to display the second interface and not displaying the viewfinder interface; and
receive a first operation of the user on the first photographing control of the second interface;
in response to the first operation of the user on the first photographing control, display, using the display screen, a third interface, wherein the third interface is the viewfinder interface, wherein the viewfinder interface displays a viewfinder frame configured to display the preview image captured by the camera of the terminal, a photographing key configured to control the terminal to save the preview image displayed in the viewfinder frame, and a gallery key configured to view an image stored in the terminal, and wherein the third interface removes the first photographing control from the first area of the display screen in the second interface and displays at least a portion of the preview image in the first area of the display screen; and
in response to a second operation of the user on the photographing key of the viewfinder interface, save the preview image in the viewfinder frame of the viewfinder interface.

2. The terminal of claim 1, wherein the change satisfying the preset condition comprises rotation of the terminal, movement of the terminal in a forward direction, and movement of the terminal in an upward direction, wherein the instructions further cause the terminal to display the first photographing control having a first transparency level when the movement of the terminal in the forward direction is a first amount of movement, wherein the instructions further cause the terminal to display the first photographing control having a second transparency level when the movement of the terminal in the forward direction is a second amount of movement, and wherein the first amount of movement is greater than the second amount of movement and the first transparency level is less transparent than the second transparency level.

3. The terminal of claim 1, wherein the second interface is of an application, and wherein the first photographing control is an icon displayed in a display region of the second interface of the application.

4. The terminal of claim 1, wherein the display screen comprises a touchscreen, and wherein the preset condition comprises that the terminal is rotated, that the terminal is moved upward, and that an included angle between the touchscreen and a horizontal line is within a preset range after the one or more sensors detect that the terminal has rotated and moved upward.

5. The terminal of claim 1, wherein the display screen comprises a touchscreen, wherein the instructions further cause the terminal to be configured to instruct the touchscreen to display the viewfinder interface in a photographing mode in response to a third operation of the user on the first photographing control, and wherein the photographing mode comprises using a rear-facing camera, a self-photographing mode, a panoramic mode, or a video recording mode.

6. The terminal of claim 1, wherein the third interface comprises a second photographing control, and wherein after the instructions cause the terminal to display the third interface, the instructions further cause the terminal to save, in response to a third operation of the user on the second photographing control, another image captured by the camera in response to the third operation.

7. The terminal of claim 6, wherein after the instructions cause the terminal to display the third interface, the instructions further cause the terminal to display, using the display screen, a fourth interface in response to a fourth operation of the user on the second photographing control, wherein the fourth operation instructs the terminal to switch between photographing modes of the terminal, wherein the fourth interface is the viewfinder interface in a photographing mode corresponding to the fourth operation, and wherein the fourth operation is different from the third operation.

8. The terminal of claim 6, wherein the display screen comprises a touchscreen, and wherein display positions of the first photographing control and the second photographing control on the touchscreen are the same.

9. The terminal of claim 1, wherein the first photographing control is a floating icon.

10. The terminal of claim 9, wherein the one or more sensors detect no operation on the first photographing control within a preset time after the first photographing control is displayed, and wherein the instructions further cause the terminal to no longer display the first photographing control on the second interface when the one or more sensors detect no operation on the first photographing control within the preset time after the first photographing control is displayed.

11. The terminal of claim 9, wherein the one or more sensors are further configured to detect whether the terminal is currently being held by a left hand of the user or by a right hand of the user, and wherein the instructions further cause the terminal to:
display the first photographing control on a left side of the second first interface when the terminal is currently being held by the left hand; and display the first photographing control on a right side of the second first interface when the terminal is currently being held by the right hand.

12. The terminal of claim 9, wherein the one or more sensors are further configured to detect that the terminal is currently held by a left hand of the user or by a right hand of the user.

13. The terminal of claim 1, wherein before displaying the first photographing control on the second interface, the one or more sensors are further configured to detect that the camera is in an off state.

14. A terminal, comprising:
a camera;
a memory configured to store instructions;
a touchscreen;
one or more sensors; and
one or more processors coupled to the camera, the memory, the touchscreen, and the one or more sensors and configured to execute the instructions to cause the terminal to:
detect a user operation in a screen-off state of the terminal;
light the touchscreen and display, using the touchscreen, a first interface when the user operation is an operation of lighting the touchscreen, wherein the first interface does not comprise a first photographing control or a viewfinder interface of the terminal;
perform the following when the user operation is different from the operation of lighting the touchscreen, includes an orientation and a position of the terminal undergoing a change satisfying a preset condition, and without detecting a touch operation from a user on the touchscreen:
display, using the touchscreen, a second interface that is different from the first interface, wherein the second interface displays the first photographing control, wherein the second interface is not the viewfinder interface of the terminal, and wherein the first photographing control is displayed in a first area of the touchscreen;
turn on the camera while continuing to display the second interface and not displaying the viewfinder interface;
capture a preview image using the camera while continuing to display the second interface and not displaying the viewfinder interface; and
receive a first operation of the user on the first photographing control of the second interface;
in response to the first operation of the user on the first photographing control:
display, using the touchscreen, the viewfinder interface, wherein the viewfinder interface displays a viewfinder frame configured to display the preview image captured by the camera of the terminal, a photographing key configured to control the terminal to save the preview image displayed in the viewfinder frame, and a gallery key configured to view an image stored in the terminal, and wherein the viewfinder interface removes the first photographing control from the first area of the touchscreen in the second interface and displays at least a portion of the preview image in the first area of the touchscreen; and
in response to a second operation of the user on the photographing key of the viewfinder interface, save the preview image in the viewfinder frame of the viewfinder interface.

15. A method implemented by a terminal, the method comprising:
detecting, by one or more sensors of the terminal, a status of holding the terminal by a user;
displaying, using a display screen of the terminal, a first interface, wherein the first interface does not comprise a first photographing control or a viewfinder interface of the terminal;
detecting that an orientation and a position of the terminal have undergone a change satisfying a preset condition and without detecting a touch operation from the user on the display screen;
in response to detecting that the orientation and the position of the terminal have undergone the change satisfying the preset condition and without detecting the touch operation from the user on the display screen:
displaying, using the display screen, a second interface with the first photographing control, wherein the second interface is not the viewfinder interface of the terminal, and wherein the first photographing control is displayed in a first area of the display screen;
turning on a camera of the terminal while continuing to display the second interface and not displaying the viewfinder interface;
capturing a preview image using the camera while continuing to display the second interface and not displaying the viewfinder interface; and
receiving a first operation of the user on the first photographing control of the second interface;
in response to the first operation of the user on the first photographing control, displaying, using the display screen, a third interface, wherein the third interface is the viewfinder interface, wherein the viewfinder interface displays a viewfinder frame configured to display the preview image captured by the camera of the terminal, a photographing key configured to control the terminal to save the preview image displayed in the viewfinder frame, and a gallery key configured to view an image stored in the terminal, and wherein the third interface removes the first photographing control from the first area of the display screen in the second interface and displays at least a portion of the preview image in the first area of the display screen;
receiving a second operation of the user on the photographing key of the viewfinder interface; and
in response to the second operation of the user on the photographing key of the viewfinder interface, saving the preview image in the viewfinder frame of the viewfinder interface.

16. The method of claim 15, wherein the change satisfying the preset condition comprises rotation of the terminal, movement of the terminal in a forward direction, and movement of the terminal in an upward direction, wherein the method further comprises:
displaying the first photographing control having a first transparency level when the movement of the terminal in the forward direction is a first amount of movement; and
displaying the first photographing control having a second transparency level when the movement of the terminal in the forward direction is a second amount of movement, and wherein the first amount of movement is greater than the second amount of movement and the first transparency level is less transparent than the second transparency level.

17. The method of claim 15, wherein the second interface is of an application, and wherein the first photographing control is an icon displayed in a display region of the second interface of the application.

18. The method of claim 15, wherein the display screen comprises a touchscreen, and wherein the preset condition comprises that the terminal is rotated, that the terminal is moved upward, and that an included angle between the touchscreen and a horizontal line is within a preset range after the one or more sensors detect that the terminal has rotated and moved upward.

19. The method of claim 15, wherein the display screen comprises a touchscreen, wherein the method further comprises instructing the touchscreen to display the viewfinder interface in a photographing mode in response to a third operation of the user on the first photographing control, and wherein the photographing mode comprises using a rear-facing camera, a self-photographing mode, a panoramic mode, or a video recording mode.

20. The method of claim 15, wherein the third interface comprises a second photographing control, and wherein after displaying the third interface, the method further comprises saving, in response to a third operation of the user on the second photographing control, another image captured by the camera in response to the third operation.

21. The method of claim 20, wherein after displaying the third interface, the method further comprises displaying, using the display screen, a fourth interface in response to a fourth operation of the user on the second photographing control, wherein the fourth operation instructs the terminal to switch between photographing modes of the terminal, wherein the fourth interface is the viewfinder interface in a photographing mode corresponding to the fourth operation, and wherein the fourth operation is different from the third operation.

22. The method of claim 20, wherein the display screen comprises a touchscreen, and wherein display positions of the first photographing control and the second photographing control on the touchscreen are the same.

23. The method of claim 15, wherein the first photographing control is a floating icon.

24. The method of claim 23, wherein the one or more sensors detect no operation on the first photographing control within a preset time after the first photographing control is displayed, and wherein the method further comprises no longer displaying the first photographing control on the second interface when the one or more sensors detect no operation on the first photographing control within the preset time after the first photographing control is displayed.

25. The method of claim 23, wherein the one or more sensors are further configured to detect whether the terminal is currently being held by a left hand of the user or by a right hand of the user, and wherein the method further comprises:
displaying the first photographing control on a left side of the second interface when the terminal is currently being held by the left hand; and
displaying the first photographing control on a right side of the second interface when the terminal is currently being held by the right hand.

26. The method of claim 15, wherein before displaying the first photographing control on the second interface, the one or more sensors are further configured to detect that the camera is in an off state.

27. The method of claim 15, wherein the one or more sensors are further configured to detect that the terminal is currently held by a left hand of the user or by a right hand of the user.

28. A method implemented by a terminal, wherein the method comprises:
detecting a user operation in a screen-off state of the terminal;
detecting that the user operation is an operation of lighting a touchscreen of the terminal;
lighting the touchscreen and displaying, using the touchscreen, a first interface when the user operation is the operation of lighting the touchscreen, wherein the first interface does not comprise a first photographing control or a viewfinder interface of the terminal;
detecting another user operation in another screen-off state of the terminal;
detecting that the other user operation is an operation different from the operation of the operation of lighting the touchscreen, includes an orientation and a position of the terminal undergoing a change satisfying a preset condition, and without detecting a touch operation from a user on the touchscreen;
performing the following when the user operation is different from the operation of lighting the touchscreen, includes the orientation and the position of the terminal undergoing the change satisfying the preset condition, and without detecting the touch operation from the user on the touchscreen:
displaying, using the touchscreen, a second interface that is different from the first interface, wherein the second interface displays the first photographing control, wherein the second interface is not the viewfinder interface of the terminal, and wherein the first photographing control is displayed in a first area of the touchscreen;
turning on a camera of the terminal while continuing to display the second interface and not displaying the viewfinder interface;
capturing a preview image using the camera while continuing to display the second interface and not displaying the viewfinder interface; and
receiving a first operation of the user on the first photographing control of the second interface;
in response to the first operation of the user on the first photographing control:
displaying, using the touchscreen, the viewfinder interface, wherein the viewfinder interface displays a viewfinder frame configured to display the preview image captured by the camera of the terminal, a photographing key configured to control the terminal to save the preview image displayed in the viewfinder frame, and a gallery key configured to view an image stored in the terminal, and wherein the viewfinder interface removes the first photographing control from the first area of the touchscreen in the second interface and displays at least a portion of the preview image in the first area of the touchscreen;
receiving a second operation of the user on the photographing key of the viewfinder interface; and
in response to the second operation of the user on the photographing key of the viewfinder interface, saving the preview image in the viewfinder frame of the viewfinder interface.

* * * * *